United States Patent [19]

LeBlanc et al.

[11] Patent Number: 5,602,903
[45] Date of Patent: Feb. 11, 1997

[54] POSITIONING SYSTEM AND METHOD

[75] Inventors: Frederick W. LeBlanc, Arveda; Gregory E. Wilson; Alparslan M. Uysal, both of Boulder, all of Colo.

[73] Assignee: US West Technologies, Inc., Boulder, Colo.

[21] Appl. No.: 314,477

[22] Filed: Sep. 28, 1994

[51] Int. Cl.$^6$ .............................. H04Q 7/22; G01S 3/02
[52] U.S. Cl. .............................. 379/60; 379/59; 342/450; 342/457
[58] Field of Search ................... 379/58, 59, 61, 379/45, 37, 50, 51; 342/450, 451, 452, 453, 454, 457, 458, 463; 370/110.1; 455/67.1, 33.1

[56] References Cited

U.S. PATENT DOCUMENTS

| | | |
|---|---|---|
| 3,889,264 | 6/1975 | Fletcher . |
| 4,054,880 | 10/1977 | Dalabakis et al. . |
| 4,799,062 | 1/1989 | Sanderford, Jr. et al. . |
| 4,833,480 | 5/1989 | Palmer et al. . |
| 4,876,738 | 10/1989 | Selby . |
| 4,888,595 | 12/1989 | Friedman . |
| 4,891,650 | 1/1990 | Sheffer . |
| 5,043,736 | 8/1991 | Darnell et al. . |
| 5,055,851 | 10/1991 | Sheffer . |
| 5,097,499 | 3/1992 | Cosentino . |
| 5,103,459 | 4/1992 | Gilhousen et al. . |
| 5,173,710 | 12/1992 | Kelley et al. . |
| 5,179,721 | 1/1993 | Comroe et al. . |
| 5,208,756 | 5/1993 | Song . |
| 5,216,429 | 6/1993 | Nakagawa et al. . |
| 5,218,367 | 6/1993 | Sheffer et al. . |
| 5,218,629 | 6/1993 | Dumond, Jr. et al. . |
| 5,221,925 | 6/1993 | Cross . |
| 5,223,844 | 6/1993 | Mansell et al. . |
| 5,280,295 | 1/1994 | Kelley et al. . |
| 5,388,147 | 2/1995 | Grimes ................................ 379/59 |

Primary Examiner—Curtis Kuntz
Assistant Examiner—Michael B. Chernoff
Attorney, Agent, or Firm—Brooks & Kushman, P.C.

[57] ABSTRACT

An improved positioning system and method for use in a wireless communication system including a plurality of base stations each having a corresponding coverage area. Scaled contour shapes are generated having minimum and maximum boundaries based upon determined RF measurements of each of the base stations. The intersections of the contour shapes define a bounding polygon area that describes the position of a mobile unit in terms of minimum and maximum error estimate. Once the bounding polygon area has been defined, the latitude and longitude of the center of the polygon area is determined whereupon corresponding street addresses may be obtained through reference to one or more databases.

19 Claims, 20 Drawing Sheets

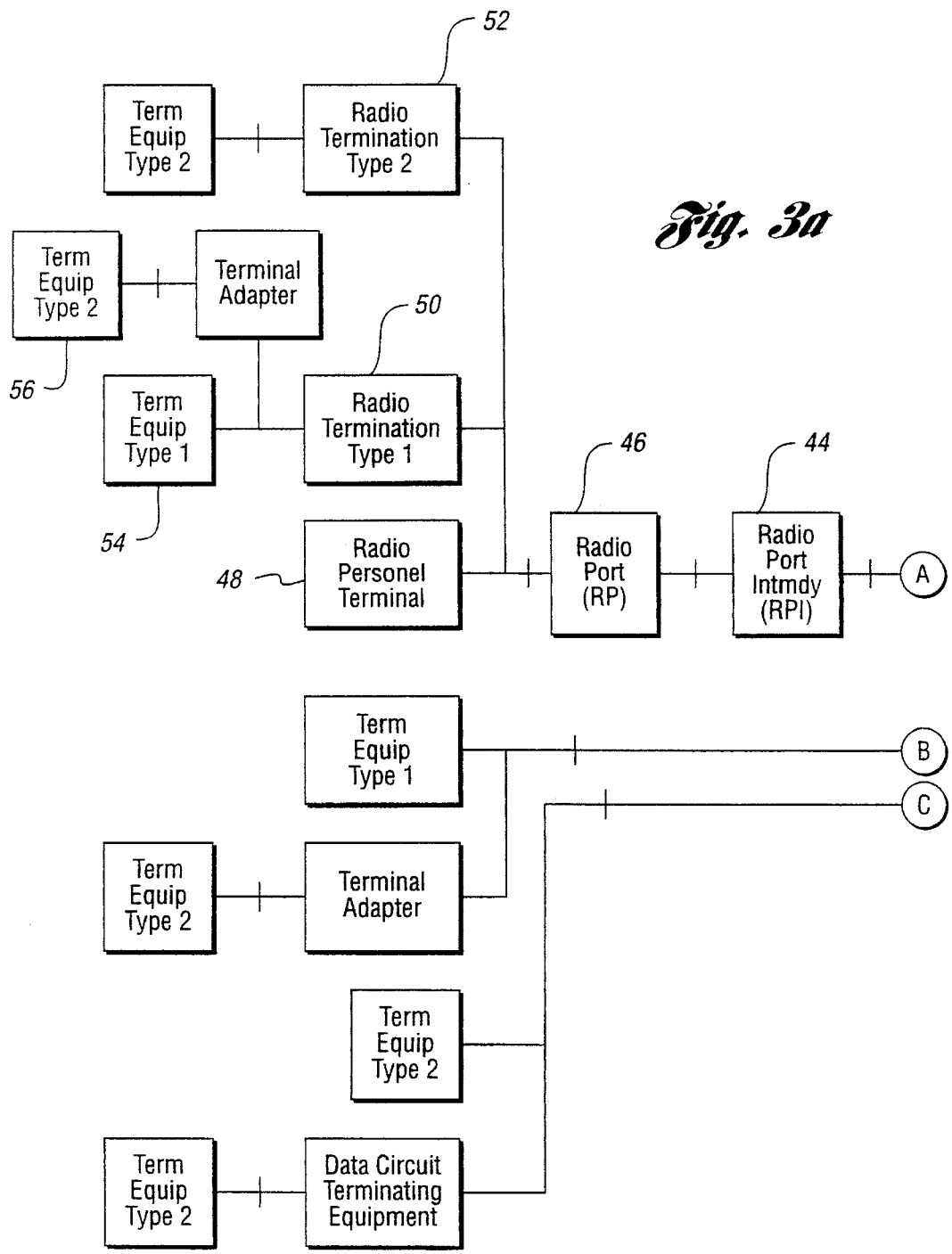

ated with the several cell site to use for further call processing

POSITIONING SYSTEM AND METHOD

TECHNICAL FIELD

The present invention relates generally to positioning systems. More particularly the invention relates to a method and system for determining the position of a mobile unit in a wireless communication system or public land mobile telecommunications system including a plurality of base stations by generating and analyzing scaled contour shapes having minimum and maximum boundaries for each of the base stations in accordance with their individual RF measurements.

BACKGROUND ART

Most metropolitan areas are now equipped with one or more forms of wireless communication networks which provide mobile telephone and other related services to customers across a broad frequency spectrum. Consider, for example, what has come to be known as "cellular" telephone services or Personal Communication Services "PCS", i.e., radio transmissions in the frequency band between approximately 800 MHz and 2.2 GHz.

As shown in FIG. 1, prior art cellular telephone systems 10 include a Mobile Telephone Switching Center (MTSC) 12 and a plurality of base stations such as cell site transceivers 14a–14c. The cell site transceivers transmit radio signals to and receive radio signals from one or more mobile units 16 that move about a cellular service area 20. A mobile unit, as the term is used herein, refers to a wireless voice telephone or data receiver that can be permanently installed at a fixed location or within a vehicle or that can be portable. Each cell site transceiver 14 is able to broadcast and receive the radio signals within a geographic area 18 called the cell site coverage area. Together, the areas 18 comprise the entire cellular service area 20. Typically, a cellular service area comprises a metropolitan area or larger region.

When a telephone call to a called mobile unit 16 originates from either another mobile unit or a land-based telephone via a Public Switched Telephone Network (PSTN) 22, a caller must first access the cellular telephone system 10. This task is accomplished by dialing the mobile unit's unique identification number (i.e., its phone number). The MTSC 12 receives the call request and instructs the control unit, i.e., the central call processor 24 to begin call processing. The central call processor 24 transmits a signal over a dedicated line 26 (such as a telephone line or microwave link, etc.) to each of the cell site transceivers 14a–14c causing the cell site transceivers to transmit a page signal that the mobile unit 16 receives. The page signal alerts a particular mobile unit 16 that it is being called by including as part of the page signal the paged mobile unit's identification or phone number.

Each cell site transceiver 14 transmits the page signal on one or more dedicated forward control channels that carry all pages, as well as control signals, channel assignments, and other overhead messages to each mobile unit. The forward control channel is distinct from the voice channel that actually carries voice communications between a mobile and another mobile unit or a land-based telephone. Each cell site transceiver may have more than one forward control channel upon which pages can be carried.

When a mobile unit is not engaged in a telephone call, it operates in an idle state. In the idle state, the mobile unit will tune to the strongest available forward control channel and monitor the channel for a page signal or other messages directed to it. Upon determining that a page signal is being transmitted, the mobile unit 16 again scans all forward control channels so as to select the cell site transceiver 14a–14c transmitting the strongest signal. The mobile unit then transmits an acknowledgement signal to the cell site transceiver over a reverse control channel associated with the strongest forward control channel. This acknowledgement signal serves to indicate to the MTSC 12 which of the forward control channels (associated with the several cell site transceivers 14a–14c) to use for further call processing communications with mobile unit 16. This further communication typically includes a message sent to the mobile unit instructing it to tune to a particular voice channel for completion of call processing and for connection with the calling party.

The details of how the cell site transceivers transmit the signals on the forward and reverse control channels are typically governed by standard protocols such as the EIA/TIA-553 specification and the air interface standards for Narrowband Analog Mobile Phone Services (NAMPS) IF-88 and IS-95 air interface standards for digital communications, all of which are well known to those of ordinary skill in the wireless telephone communications art and therefore will not be discussed.

While cellular networks have been found to be of great value to mobile users whose travels span many miles, they have also been found to be prohibitively expensive to implement for small scale applications wherein system subscribers only desire wireless telephone services in limited geographic areas, such as, for example, within office buildings or in campus environments.

The Personal Communications Network (PCN) is a relatively new concept in mobile communications developed specifically to serve the aforementioned applications. Similar to cellular telephony goals, a Personal Communications Network goal is to have a wireless communication system which relates telephone numbers to persons rather than fixed locations. Unlike cellular telephones, however, the PCN telephones are directed to small geographic areas thus defining "microcellular" areas designed to operate in similar fashion to large scale cellular telephone networks. PCN technologies are also similar to residential cordless telephones in that they utilize base stations and wireless handsets. Unlike the former, however, PCN technology utilizes advanced digital communications architecture, such as, for example, PACS, formerly called WACS, (Bellcore), DECT (European), CDMA (Omni-point), PHS-PHP (Japan), IS-54 (TDMA), IS-95 (CDMA), PCS-1900 (GSM), and B-CDMA (Oki), and features which may be implemented either as private networks or regulated services. When offered by communications carriers as services, this PCN capability is generally referred to as Personal Communications Services (PCS), and may be situated in a wide variety of environments, including, for example, outdoor urban, suburban, rural, indoor single-level and indoor multi-level areas.

As shown in FIG. 2, prior art PCS systems 28 include one or more control units 30 which, in accordance with the American National Standards Institute (ANSI) T1P1 working document for stage 2 service description, as known to those skilled in the art, are termed Radio Port Controllers (RPCs), Radio Access System Controllers (RASCs), access managers, etc. These control units 30 operate in similar fashion to the MTSC 12 of the cellular telephone network and, therefore, are provided in electrical communication with the Public Switched Telephone Network 22. A plurality of base stations or Radio Ports (RPs) 32 are also provided which transmit radio signals to and receive radio signals from one or more subscriber wireless telephones 16, termed mobile units or Radio Personal Terminals (RPTs) that move about a PCS service area 34. Each Radio Port 32, like cell site transceivers 14, is able to broadcast and receive radio signals within a geographic area 36 called the Radio Port coverage area. Together, the areas 36 comprise the entire PCS service area 34.

A generalized reference architecture for the PCS system of FIG. 2 is shown in further detail in FIGS. 3a–3b. The reference architecture includes reference elements which support radio access, wireline access, switching and control, mobility management, and Operations, Administration, Maintenance and Purchasing (OAM&P). As shown in the schematics, the PCS system includes a PCS Switching Center (PSC) 38 which supports access independent call/ service control and connection control (switching) functions and is responsible for interconnection of access and network systems to support end-to-end services. The PCS switching center 38 represents a collection of one or more network elements. The system further includes a Radio Access System Controller (RASC) 40 which supports the wireless mobility management and wireless access call control functions. It serves one or more subtending radio port controllers 42 and may be associated with one or more PCS switching centers 38. As known to those skilled in the art, Radio Port Controllers 42 provide an interface between one or more subtending Radio Port Intermediaries (RPIs), a PCS switching center such as PSC 38, and RASC, air interface independent radio frequency transmission and reception functions.

The system further includes a Radio Port Intermediary (RPI) 44 which provides an interface between one or more subtending Radio Ports 46 and the Radio Port Controller 42, and supports air interface dependent radio frequency transmission and reception functions. Radio Port 46 supports the transmission of signals over the air interface and is provided in communication with Radio Personal Terminal (RPT) 48. This is a light-weight, pocket-size portable radio terminal providing the capability for the user to be either stationary or in motion while accessing and using telecommunication services.

The system further includes variations of RPTs which are in fixed locations, termed Radio Termination (Type 1) 50 and Radio Termination (Type 2) 52, which interface Terminal Equipment (Type 1) 54 and Terminal Equipment (Type 2) 56 to the Radio Access Interface.

The system of FIG. 3 further includes a Terminal Mobility Controller (TMC) 58 which provides the control logic for terminal authentication, location management, alerting, and routing to RPT/RTs. There is also provided a Terminal Mobility Data-store (TMD) 60 which is operative to maintain data associated with terminals.

Still further, the system includes a Personal Mobility Controller (PMC) which provides the control logic for user authentication, service request validation, location management, alerting, user access to service profile, privacy, access registration, and call management. PMC 62 is provided in communication with a Personal Mobility Data-store (PMD) which maintains data associated with users.

Finally, the system includes Operations, Administration, Maintenance, and Provisioning, (OAM & P) systems 66 which monitor, test, administer, and manage traffic and billing information for personal communications services and systems. PCS 38 is also provided in communication with Auxiliary Services 68, Interworking Functions (IWF) 70 and External Networks 72. In accordance with the above-referenced working document for Stage 2 service description, Auxiliary Services 68 are defined as a variety of services such as voice mail, paging, etc. which may not be provided by the PCS 38. IWF 70 are further defined as mechanisms which mask the differences in physical, link and network technologies into consistent network and user services. Still further, External Networks 72 are defined as other voice, digital data, packet data, and broadband data networks.

FIG. 4 provides a unified functional model of the detailed system of FIG. 3. This functional model is derived from the PCS reference architecture in FIGS. 3a–3b by aggregating the terminal entities (RT and RPT) into a single functional grouping Radio Terminal Function (RTF), and aggregating RP, RPI, and RPC into another single functional grouping RCF in accordance with the ANSI Stage 2 service descriptions for PCS. The model includes Call Control Function (CCF) 74, Service Switching Function (SSF) 76, Service Control Function (SCF) 78, Service Data Function (SDF) 80, Service Resource Function (SRF) 82, Radio Access Control Function (RACF) 84, Radio Control Function (RCF) 86, and Radio Termination Function (RTF) 88. The functions of the terminal elements are more fully described in the Stage 2 service description for PCS.

Wireless communication services such as the above cellular and PCS systems, have been quickly embraced by those people whose business requires them to travel frequently and to be in constant communication with their clients and associates. The increased use of wireless communication services, however, have caused headaches for emergency operators and other position dependent service providers who require precise location data. As known to those skilled in the art, under current wireless technology, position data is strictly limited to relatively large coverage areas and sectors thereof as defined by the RF characteristics, i.e. footprints, of the associated base station. As explained below, these coverage areas are generally unsuitable for most commercial and consumer applications.

In the late 1960's, federal legislation was enacted which established the 9-1-1 telephone number as a national emergency resource. In land-based systems, Enhanced 9-1-1 (E 9-1-1) wireline technology provides the caller's Automatic Location Identification (ALI) with reasonable accuracy, cost and reliability, to a Public Safety Answering Point (PSAP) via a defacto standard. ALI is generally accomplished by receiving the ANI, or Automatic Number Identification, during call setup to the PSAP. A database query, given ANI, provides ALI to the emergency call taker display terminal as both parties establish the voice channel.

Currently wireless technology, however, does not provide ALI. As a result, an ever-increasing percentage of emergency telephone calls can be tracked no further than the originating base station. As readily seen, the heart of the problem for providing E9-1-1ALI services for wireless communication customers lies in accurately and reliably determining the mobile unit, i.e., handset location, under any circumstance, at low cost.

Against this background, there have been previous attempts to provide methods and systems which generally identify the positions of wireless communication system users in cell site coverage areas and sectors thereof. See, for example, U.S. Pat. No. 4,876,738 issued to Selby and assigned to U.S. Phillips Corporation. Selby discloses a registration procedure in which the base station monitors the location of the mobile unit by cell site. The effect is to allow enlargement of the registration area if the mobile unit consistently roams between two cells.

See also, U.S. Pat. No. 5,179,721 issued to Comroe et al and assigned to Motorola, Inc. Comroe discloses a method for inter-operation of a cellular communication system and trunking communication system by transmitting an access number for each system such that the mobile unit may be used as a cellular telephone and a trunking communication device.

Still further, see U.S. Pat. No. 5,097,499 issued to Consentino and assigned to AT&T Bell Laboratories. Consentino teaches a method for preventing an overload in a reverse channel by delaying the time of the generation of timing stamps on markers.

These methods and systems, however, have proven unsuitable for commercial and consumer applications where users may, at any given time, travel through very small portions of numerous cell site coverage areas and sectors. Under current wireless technology, and as described in the prior art referenced above, presently available positioning methods and systems are limited to a determination of whether the user is within one or more predetermined cell site coverage areas or sectors. These prior art systems are incapable of providing further detail, i.e. exactly where in the cell site coverage area the user is located.

Prior art attempts to design higher accuracy positioning systems which utilize commercial broadcast transmissions, for example, have also met with limited success. See, for example, U.S. Pat. Nos. 4,054,880 (Dalabakis et al) and 3,889,264 (Fletcher) which disclose what are known as "delta-position" systems. These prior art patents describe systems using three spectrally spaced-apart radio signals, each of which is an independent AM radio signal. The systems typically have a vehicle carried mobile receiver, with a separate tuner for each station, and a second receiver at a fixed, known position. As disclosed, these systems count "zero crossing counts", each of which indicates that the user has moved a certain distance from his or her previous location. In operation, if it is desired to determine the current position of the user, a starting position must first be specified. A fixed position receiver detects frequency drift of the transmitters, which is used to adjust and coordinate zero crossing counts made by the mobile receivers.

These systems are termed "delta-position" systems because they determine only the distance and direction traveled by a mobile user from any particular starting point. Neither Dalabakis et al nor Fletcher actually determines the position of the mobile user.

See also, U.S. Pat. No. 5,173,710 to Kelley et al which discloses the use of a fixed position receiver which is adapted to determine frequency drift along with the relative phases of various unsynchronized FM broadcast signals originating from known fixed locations. As disclosed by Kelley, each of the fixed transmitters transmits a beacon signal having a phase that is unsynchronized with the phases of the beacon signals of the other transmitters. These signals are 19 Khz analog pilot tones generated by commercial broadcast stereo FM stations. The fixed receiver receives the beacon signals, determines the relative phases of the beacon signals, and broadcasts data representing these relative phases for receipt by the mobile receiver which is at an unknown location. Each mobile receiver includes phase measurement circuitry that detects the phases of the beacon signals at the mobile receiver's current position on multiple distinct carrier frequencies such that the current position of the mobile unit may be determined when used in conjunction with the fixed receiver broadcast data.

See also, U.S. Pat. Nos. 5,055,851; 4,891,650; and 5,218,367, all issued to E. Sheffer and assigned to Trackmobile, Inc. Like the '650 patent, the '851 patent utilizes measurements of the mobile unit's signal strength which is detected by some number of neighboring base stations in order to calculate location. In operation, each base station transmits a special packet of data which includes this information for receipt by the MTSC. Another packet of information, the actual vehicle alarm distress call (this is not the same as a 9-1-1 call), is also sent to the MTSC. The MTSC sends these two information packets to a Trackmobile alarm center personal computer. The computer matches both packets using a simple algorithm in order to find the vehicle's distance from the base station cell center point. As disclosed, this is done preferably with four neighboring base station cell site measurements along with arcuation or line intersection techniques. The results are displayed on a computer screen map. A 9-1-1 call may then be initiated by a Trackmobile attendant, based on a verbal request from the originating mobile user.

The Trackmobile '367 patent operates in much the same way as the '851 and '650 patents although it uses a modified handset including a modem, to send signal strength measurements received at the mobile unit, through the cellular network to the Trackmobile alarm center. Only the downlink signal strengths, received at the mobile unit, are used to estimate location. The location is determined from the same algorithm as in the '851 patent, but includes a refinement—antenna sector ID—if known. As disclosed, the sector ID information reduces error by effectively slicing the cell circle into one of three pie-shaped sections. In the case of low power PCS installations, it is likely that omnidirectional antennas would be used, thus precluding the use of this sector refinement.

None of the systems referenced above, as well as general time difference of arrival location systems such as LORAN, NAVSTAR, and GPS, as used for example in U.S. Pat. No. 4,833,480, issued to Palmer et al, have proven suitable for commercial applications since, by design, they require specially adapted receivers to receive and process the pilot tones, GPS signals, etc. at the mobile unit. This sophisticated end equipment, of course, significantly adds to the cost of the corresponding mobile unit. In the case of hand portable units, this additional equipment further results in a handset which is extremely bulky and difficult to handle. As a result, these systems have proven unsuitable for both large scale commercial applications, as well as ordinary consumer use.

When applied to wireless communications of interest to the present invention, i.e. communications in the frequency band from 800 MHz to 2.5 GHz, these prior art systems are further considered unsuitable for commercial applications in view of their anticipated use of excessive frequency spectrum. More specifically, it is anticipated that for proper operation, these systems would necessarily require transmission of signals on separate channels which would utilize an unacceptable amount of additional spectrum.

The prior art systems also fail to account for changes in environmental conditions. For GPS receivers, it is known to those skilled in the art that the location calculation will not work unless there is a clear view of at least 3–4 satellites. In dense urban areas, especially at the street level, this condition could easily prevail as potential users move about in the environment. Thus, no location estimate would be available if less than three satellite signals can be received.

In many office buildings, the metal content of the windows is also sufficient to preclude effective satellite reception. To this end, if all wireless antennas were isotropic and were located in flat and open terrain, estimating the location of a handset using the prior art strength technology might be sufficient. Unfortunately, the known disadvantage of the PCS world, and to a reasonable extent, cellular, is that they do not operate in flat and open terrains. None of the prior art patents work in areas where there are obstructions to the radio signal's path like buildings, trees, hills, and automobiles. Seasons are also known to have a dramatic affect on propagation where radio waves are significantly attenuated by tree leaves in the summer, but less so in the winter. Thus, actual RF field data gathered in one season may not be accurate in another season.

As readily seen, precisely predicting location based on RF propagation loss has generally been an intractable problem, due to the complexity of factors, as well as the data collection difficulties in constructing the necessary databases needed to supply the actual field data. Thus, the principles relied upon by the above-referenced patents, such as free space loss or clear access to satellites, rarely exists, as obstructions and interference increases daily, even in the most optimal RF environments.

Consequently, a need has developed to provide a positioning system and method which may be practically and economically implemented for use in wireless communication systems and, in particular, in the frequency band from 800 MHz to 2.5 GHz.

Still further, a need has developed to provide such a positioning system which may be used by service providers to provide location information for use in emergency situations such as locating an E9-1-1 caller, enforcing restraining orders and house arrests, confirming the intended location of a user at predetermined times and the like. It is further desirable that such a system and method be compatible with existing wireless telephone technology and should not degrade the operation of an existing system. Finally, such a system should neither require the allocation of more radio frequencies than are currently allocated to wireless telephone systems, nor require a substantial portion of existing wireless frequencies.

DISCLOSURE OF THE INVENTION

It is a general object of the present invention to overcome the limitations of the prior art by providing a positioning system and method for accurately determining the location of a mobile unit in a plurality of environments, including rural, suburban, urban, and similar arena environments.

More particularly, it is an object of the present invention to provide a method for determining the position of a mobile unit in a wireless communication system including a plurality of base stations each having a corresponding coverage area by generating scaled contour shapes having minimum and maximum boundaries based upon the determined RF measurements of each of the base stations.

In carrying out these and other objects, features and advantages of the present invention, a method is provided for determining the position of a mobile unit, such as, for example, a wireless telephone, Personal Digital Assistant (PDA) or similar interactive electronic device. The method is also applicable to spread-spectrum residential cordless telephones which operate in the 900 MHz band.

According to the invention, the method is provided for use in a wireless communication system, sometimes also referred to as a public land mobile telephone system, which includes a plurality of base stations each having a corresponding coverage area. For each of the base stations, a plurality of RF measurements are determined in cooperation with a receiver, including the link budget of the base station, for a predetermined plurality of distances and directions. The determined RF measurements for each of the base stations are modeled as a scaled contour shape having minimum and maximum boundaries and which is capable of being projected on a mapping system such as an orthophotograph. The base stations which neighbor the mobile unit are thereafter determined and their corresponding RF measurements contours are analyzed to further determine where they intersect.

In accordance with the invention, the intersections of these neighboring base station contours will define a bounding polygon area that describes the position of the mobile unit in terms of minimum and maximum error estimate. Once the bounding polygon area has been defined, the latitude and longitude of the center of the polygon area may also be determined whereupon the street addresses contained therein may be learned through reference to one or more databases.

In keeping with the invention, the modeling of the determined RF measurements as scaled contour shapes requires the initial segmenting of the coverage areas of each of the base stations into a plurality of arc segments. For each of the arc segments, a plurality of single or multiple regressions are thereafter performed a corresponding so as to convert actual data into plurality of mathematical curve-fit equations, each representing a relationship between a predetermined measurable variable, i.e. Relative Signal Strength Indication uplink ($RSSI_{up}$), Relative Signal Strength Indication downlink ($RSSI_{down}$), Word Error Rate uplink ($WER_{up}$), Word Error Rate downlink ($WER_{down}$), Quality Indication uplink ($QI_{up}$), Quality Indication downlink ($QI_{down}$), Time Differential uplink ($TD_{up}$), Time Differential downlink ($TD_{down}$), instantaneous power of each transmitter, start-up power of each transmitter, etc. and distance from the base station. Note that in certain cases of TDMA and CDMA technologies, the initial and instantaneous transmitter power levels must also be known.

For each of the arc segments, the degree of fit of the corresponding mathematical equations may thereafter be determined by comparing each of the mathematical equations with actual data. The equations may further be optimized by using a set of heuristic rules to determine which has the best correlation and least standard error for a predetermined portion of each arc segment. Finally, the optimized mathematical equations may be combined for each arc segment so as to form the scaled contour shape corresponding to each base station.

In an alternative embodiment, a Genetic Algorithm (GA) may further be used to optimize the parameters of each of the single or multiple regressions so as to further improve the degree of fit for greater correlation and minimum standard error.

In another alternative embodiment, fuzzy logic techniques may be used to quantize the best RF measurement using a set of fuzzy rules for optimizing the correlation of RF measurements with respect to distance.

Still further, in yet another alternative embodiment, in cases where there is generally poor correlation between all of the mathematical equations of an arc segment and the actual data, such as areas of highly variable shadow and/or Rayleigh fading, the corresponding base station may be instructed along with the receiver, i.e., the mobile unit, to each temporarily change their transmission frequencies by 10–40 MHz. Thereafter, additional RF measurements may be obtained for the base station at the changed frequency, including its link budget, for the same predetermined plurality of distances and directions, thus yielding an increased number of variables for consideration and analysis.

In carrying out the above objects, there is further provided a positioning system in accordance with the present invention. The system includes at least one base station such as a cellular tower or Radio Port which is operative to receive calls originating from one or more mobile units over air interface channels in cooperation with a control unit such as a Mobile Telephone Switching Center (MTSC) or a Radio Port Controller (RPC). A location databank is also provided which is operative to store real-time RF measurements for the base station, including its link budget. Finally, the system includes a Location Adjunct Processor (LAP) such as an Intelligent Peripheral (IP) or the like, which is in electrical communication with the location database and the control unit. The LAP is operative to access the location database and determine and forward the location of the mobile unit to the control unit.

In one preferred embodiment, a positioning system is provided specifically for use with the Public Switched Telephone Network (PSTN). A control unit is thus provided in electrical communication with the PSTN and is operative to receive calls forwarded by the base station, temporarily suspend call processing and generate a call information request signal. The Location Adjunct Processor which, as referenced above, is provided in electrical communication with the location database and the control unit, is operative to receive the call information request signal, access the location database and determine and forward the location of the mobile unit to the control unit, whereupon the call will be forwarded to the PSTN along with the determined mobile unit location.

In an alternative embodiment, a positioning system and in particular, a location transport system is provided in accordance with the above teachings for routing Enhance 9-1-1 (E9-1-1) calls from mobile units. The system is similarly directed for use in a Public Switched Telephone Network (PSTN) having at least one end central office or PCS switching center, which is provided in electrical communication with a plurality of public Safety Answering Points (PSAPs) and an Automatic Location Identification/Data Management system (ALI/DM) database via an E9-1-1 selective router.

Like the aforementioned positioning systems, the location transport system of this embodiment includes a plurality of base stations each operative to receive calls originating from a plurality of mobile units (personal stations, radio personal terminals, etc.) over air interface channels. Each of the base stations, however, also includes a pseudo directory number uniquely associated with it and stored in the ALI/DM database along with its location. A control unit is also provided in electrical communication with the base station and is operative to receive calls forwarded by the base stations, temporarily suspend call processing, and generate a call information request signal. Still further, a location databank is provided which is operative to store real-time RF measurements for each of the base stations, including its link budget. Finally, the system includes a Location Adjunct Processor (LAP) which is in electrical communication with the location databank and the control unit.

In accordance with the invention, the LAP is operative to receive the call information request signal, access the location databank, and determine and forward the location of the mobile unit to the control unit. Thereafter, the call will be forwarded to one of the PSAPs in accordance with the pseudo directory number of the corresponding base station along with its determined location and the location of the mobile unit that originated the call. The location information may be provided as a text description, video description, data point description, or may even be audibly announced through the use of a voice synthesizer, etc. The location information may also be provided through the use of a modem which is in electrical communication with the LAP.

In further carrying out the above-stated objects, there is also provided yet another embodiment of a positioning system in accordance with the above teachings which is directed for use in a modified Advanced Intelligent Network (AIN). The system includes a control unit such as an MTSC when used in a cellular system, or a RPC when used in PCS systems. At least one base station is also provided in electrical communication with the control unit. There is further provided a Service Transfer Point (STP) and a Service Control Point (SCP) which are in electrical communication with one another. The SCP is operative to invoke a plurality of Service Logic Programs (SLPs). In keeping with the invention, and with reference to the ANSI Stage 2 service architecture of FIG. 3, the SCP can be used to embody the functions of the TMD 60 and/or the TMD 58, PMC 62, PMD 64, OR RASC 40. The system further includes a Service Switching Point (SSP) in electrical communication with the control unit and the STP.

As disclosed in this embodiment, the SSP is operative to temporarily suspend call processing and send a call information request signal to the SCP via the STP so as to invoke the SLP. A location database operative to store real-time RF measurements for the base station, including its link budget, is also provided. Finally, the system includes a Location Adjunct Processor (LAP) in electrical communication with the control unit, the location database, and the SCP. The LAP is operative to access the location database and determine and forward the location of the mobile unit to the control unit at the request of the SLP.

BRIEF DESCRIPTION OF THE DRAWINGS

The foregoing aspects and many of the attendant advantages of this invention will become more readily appreciated as the same becomes better understood by reference to the following best modes for carrying out the invention, when taken in conjunction with the accompanying drawings wherein:

FIGS. 3a–3b are detailed schematic diagrams of the reference architecture of the PCS system of FIG. 2;

BEST MODES FOR CARRYING OUT THE INVENTION

Figure 5:
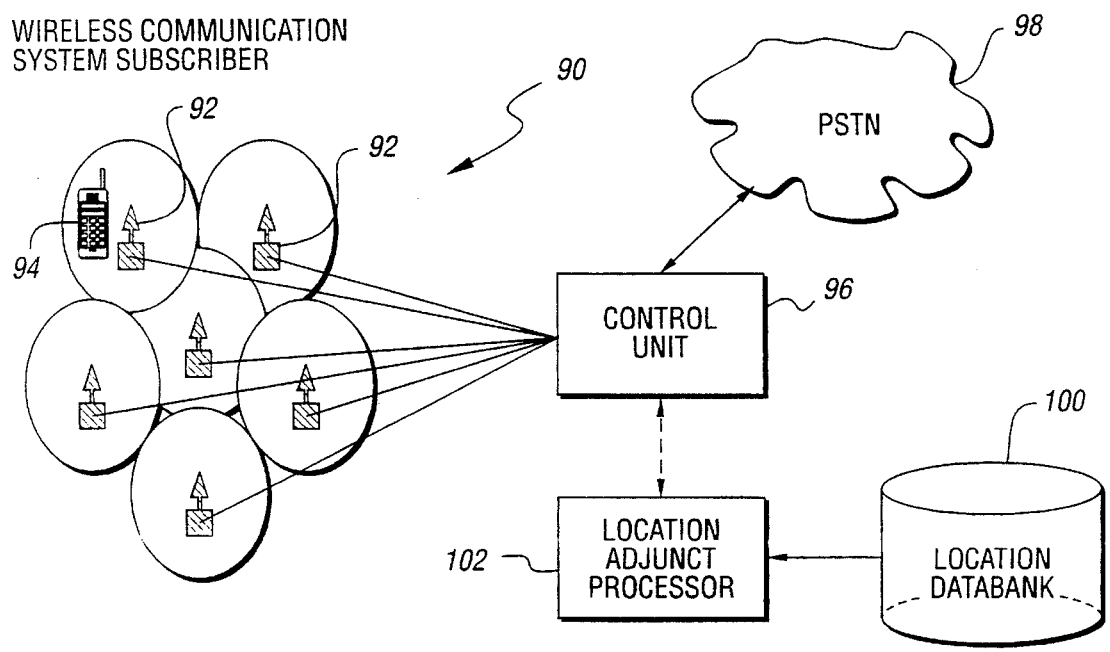
FIG. 5 is a schematic diagram of a first embodiment of the positioning system of the present invention adapted for use in a wireless telephone system.

With reference to FIG. 5 of the drawings, there is provided a schematic diagram of the generalized positioning system of a first embodiment of the present invention shown as adapted for use in a wireless telephone system, sometimes also called a public land mobile telecommunications system. It should be understood, however, that the method and system of the present invention may be suitable for use with most interactive electronic devices such as the above-referenced Personal Digital Assistance (PDAs) and the like. For example, in the case where a PDA is available, through a series of mutually agreed upon message formats between the LAP and the PDA, location information can be sent to the PDA device instead of or in addition to forwarding information to the PSTN 98. The following disclosure is thus intended as one of example and not limitation.

The positioning system shown in FIG. 5 is designated generally by reference numeral 90. As shown, positioning system 90 includes at least one base station 92 such as a Radio Port (RP) which is operative to receive calls from one or more mobile units 94 such as Radio Personal Terminals (RPTs) or cordless radio telephones, etc. over air interface channels. The system further includes a control unit 96 such as a Radio Port Controller (RPC) or Radio Access System Controller (RASC), which is provided in electrical communication with the Public Switched Telephone Network (PSTN) 98. The functions of control unit 96 may be implemented in a Mobile Telephone Switching Center (MTSC) when used in a cellular telephone network or they may be implemented in a RPC or RASC when used in a PCS system or the like. A location databank 100 is also provided which is operative to store real-time RF measurements for the base stations 92, including their link budgets.

As explained in further detail herein, these RF measurements may include, for example, Relative Signal Strength Indication uplink ($RSSI_{up}$), Relative Signal Strength Indication downlink ($RSSI_{down}$), Word Error Rate uplink ($WER_{up}$), Word Error Rate downlink ($WER_{down}$), Quality Indication uplink ($QI_{up}$), Quality Indication downlink ($QI_{down}$), Time Differential uplink ($TD_{up}$), Time Differential downlink ($TD_{down}$), initial and instantaneous power levels, etc. and distance from the base station. Finally, the positioning system 90 includes a Location Adjunct Processor (LAP) 102 which may be an Intelligent Peripheral (IP) or other suitable device which is in electrical communication with the location databank 100 and the control unit 96. The LAP 102 is operative to access the location databank 100 and determine and forward the location of the mobile unit 94 to the control unit 96.

As shown, in this embodiment, the positioning system 90 is directed for use with the Public Switched Telephone Network (PSTN) 98 which is provided in electrical communication with the control unit 96. Control unit 96 is therefore operative to receive calls forwarded by base stations 92, to temporarily suspend call processing, and to generate call information request messages. The LAP 102 receives the call information request messages, accesses location databank 100 and determines and forwards the location of the mobile unit 94 to the control unit 96. The call is thereafter forwarded to the PSTN 98 along with the determined mobile unit location information.

Figure 6:
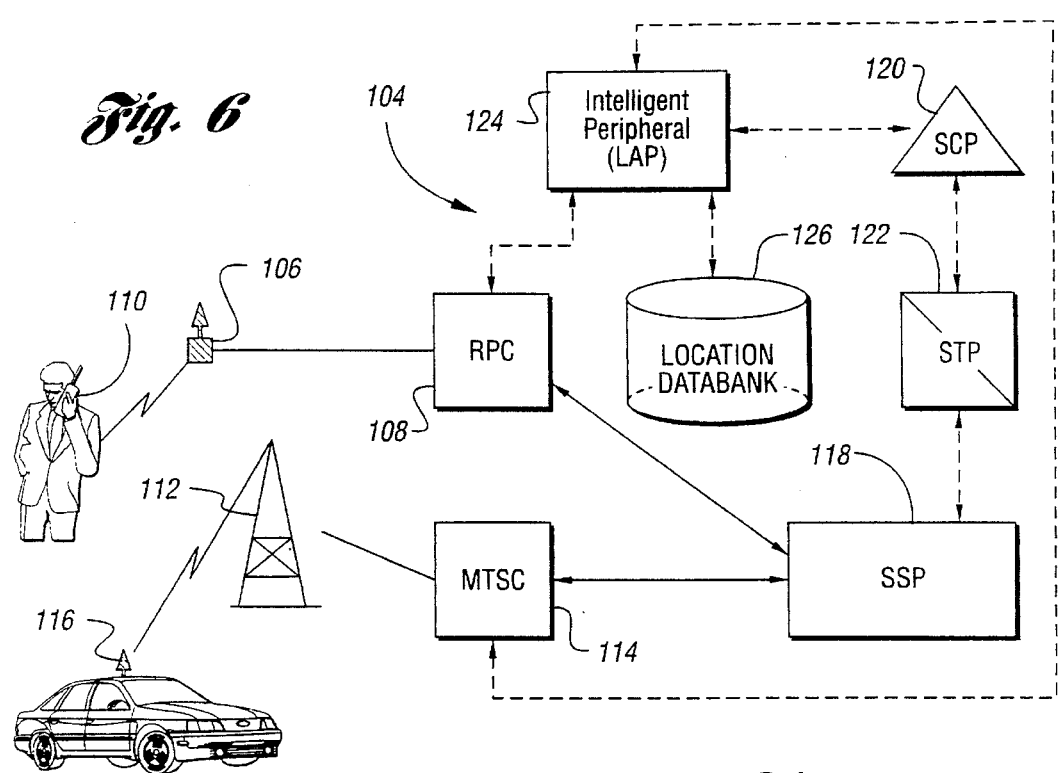
FIG. 6 is a schematic diagram of a second embodiment of the positioning system of the present invention adapted for use in a modified Advanced Intelligent Network (AIN)

In an alternative embodiment shown in FIG. 6 of the drawings, a positioning system 104 is provided which is directed for use in a modified Advanced Intelligent Network (AIN) and is operative to handle both high power cellular and low power PCS calls. System 104 includes at least one PCS Radio Port 106 which is provided in electrical communication with a control unit 108 such as a Radio Port Controller or Radio Access System Controller for receiving PCS calls from a PCS mobile unit such as a Radio Personal Terminal 110. Similarly, a traditional power base station including a cellular tower 112 is provided in electrical communication with MTSC 114 for receiving cellular calls from a cellular mobile unit 116. Both RPC 108 and MTSC 114 are provided in electrical communication with Service Switching Point (SSP) 118 which in turn is provided in electrical communication with Service Control Point (SCP) 120 through Service Transfer Point (STP) 122. RPC 108 and SCP 120 are further provided in electrical communication with a Location Adjunct Processor (LAP) such as Intelligent Peripheral (IP) 124.

As those skilled in the art will recognize, Service Switching Points 118 are generally nodes (usually the subscriber's local switch/central office switch) which provide the Service Switch Functions (SSF) that recognize the "triggers" used when a subscriber invokes an Intelligent Network Service and then communicates with the SCP 120 to operate the service. Service Control Point 120 is similarly a node which contains the service logic and associated data support to execute the required customer services. Finally, Service Transfer Point 122 is a packet switch used to route signaling messages within the Advanced Intelligent Network. These packet switching elements are known to those having ordinary skill in the art and will, therefore, not be discussed in further detail.

In keeping with the invention, SCP 120 is operative to invoke a Service Logic Program (SLP). SSP 118 is further operative to temporarily suspend call processing and send a call information request signal to SCP 120 via STP 122 so as to invoke the SLP. Standard AIN messages, such as Play_Announcement and Collect Digits can be utilized to request RF measurement data to be sent over the signalling system to the SLP, and from the SCP 120 to the IP 124. The IP-SCP API can be implemented using any mutually agreed-upon message set, such as Structured Query Language (SQL), which is supported by most vendors. Alternatively, the following messages could be used to define the IP-SCP API:

```
- getData: SCP requests data from the IP (or LAP),
- getDataResult: IP (LAP) sends requested data to the SCP,
- sendData: SCP sends updated data to the IP (LAP),
- sendDataResult: IP (LAP) responds with status of SCP's update request.
getData              OPERATION
PARAMETER            SEQUENCE {
                       serviceKey              ServiceKey,
                       securityIdentifier      SecurityIdentifier OPTIONAL,
                       requestedDataElements   DataElementList
                     }
RESULT               SEQUENCE {
                       resultType              ResultType,
                       dataElementsReturned    DataElementBlock
                     }
ERRORS               {
                       missingCustomerRecord,
                       dataUnavailable,
                       taskRefused,
                       unauthorizedRequest,
                       generalFailure,
                       timerExpired,
                       systemNotResponding,
                       incompatibleVersions,
                       queueFull,
                       resultsTooLong
                     }
::=59137
sendData             OPERATION
PARAMETER            SEQUENCE {
                       serviceKey              ServiceKey,
                       securityIdentifier      SecurityIdentifier OPTIONAL,
                       updateDataElements      DataElementBlock
                     }
RESULT               SEQUENCE {
                       resultType              ResultType,
                       dataElementsUpdated     DataElementBlock
                     }
ERRORS               {
                       missingCustomerRecord,
                       dataUnavailable,
                       unauthorizedRequest,
                       generalFailure,
                       timerExpired,
                       systemNotResponding,
                       incompatibleVersions,
                       queueFull,
                     }
::=59138
generalFailure          ERROR ::= 1
missingCustomerRecord   ERROR ::= 4
dataUnavailable         ERROR ::= 6
taskRefused             ERROR ::= 7
queueFull               ERROR ::= 8
timerExpired            ERROR ::= 10
systemNotResponding     ERROR ::= 15
unauthorizedRequest     ERROR ::= 20
incompatibleVersions    ERROR ::= 60
resultsTooLong          ERROR ::= 61
ServiceKey ::= [10] CHOICE {
   lineNumber [0] IMPLICIT Digits
   -- other types of service keys may be added in the future
}
DataElementList ::= SET OF ElementIdentifier
ResultType ::= [203] IMPLICIT ENUMERATED {
```

```
        completeSuccess (0),
        partialSuccess (1),
        complete Failure (2)
    }
DataElementBlock ::= SET OF DataElement
DataElement ::= SEQUENCE {
    elementIdentifier ElementIdentifier,
    elementValue ElementValaue
}
ElementIdentifier ::= INTEGER
ElementValue ::= CHOICE {
    elementError [0] IMPLICIT ElementError,
    elementData [1] ElementData
}
ElementError ::= ENUMERATED {
    ee-successfulUpdate      (0),
    ee-generalFailure        (1),
    ee-missingCustomerRecord (4),
    ee-dataUnavailable       (6),
    ee-taskRefused           (7),
    ee-timerExpired          (10),
    ee-systemNotResponding   (15),
    ee-unauthorizedRequest   (20),
}
ElementData ::= CHOICE {
    elemBoolean      [0] IMPLICIT BOOLEAN,
    elemInteger      [1] IMPLICIT INTEGER,
    elemString       [2] IMPLICIT OCTET STRING,
    elemDigits       [3] IMPLICIT Digits,
    elemReal         [4] IMPLICIT REAL,
    elemAindigits    [5] IMPLICIT AINDigits
    -- possibly other standard types
}
Digits ::= OCTET STRING -- as defined in TR-246
AINDigits ::= OCTET STRING -- as defined in TR-1285
SecurityIdentifier ::= [202] CHOICE {
    pin [0] IMPLICIT Digits
}
END
```

The above text provides an example of a method of specifying the LAP-SCP interface using Abstract Syntax Notation 1 to define the get data and send data structure. A similar technique could be used to define the result messages.

Figure 1:
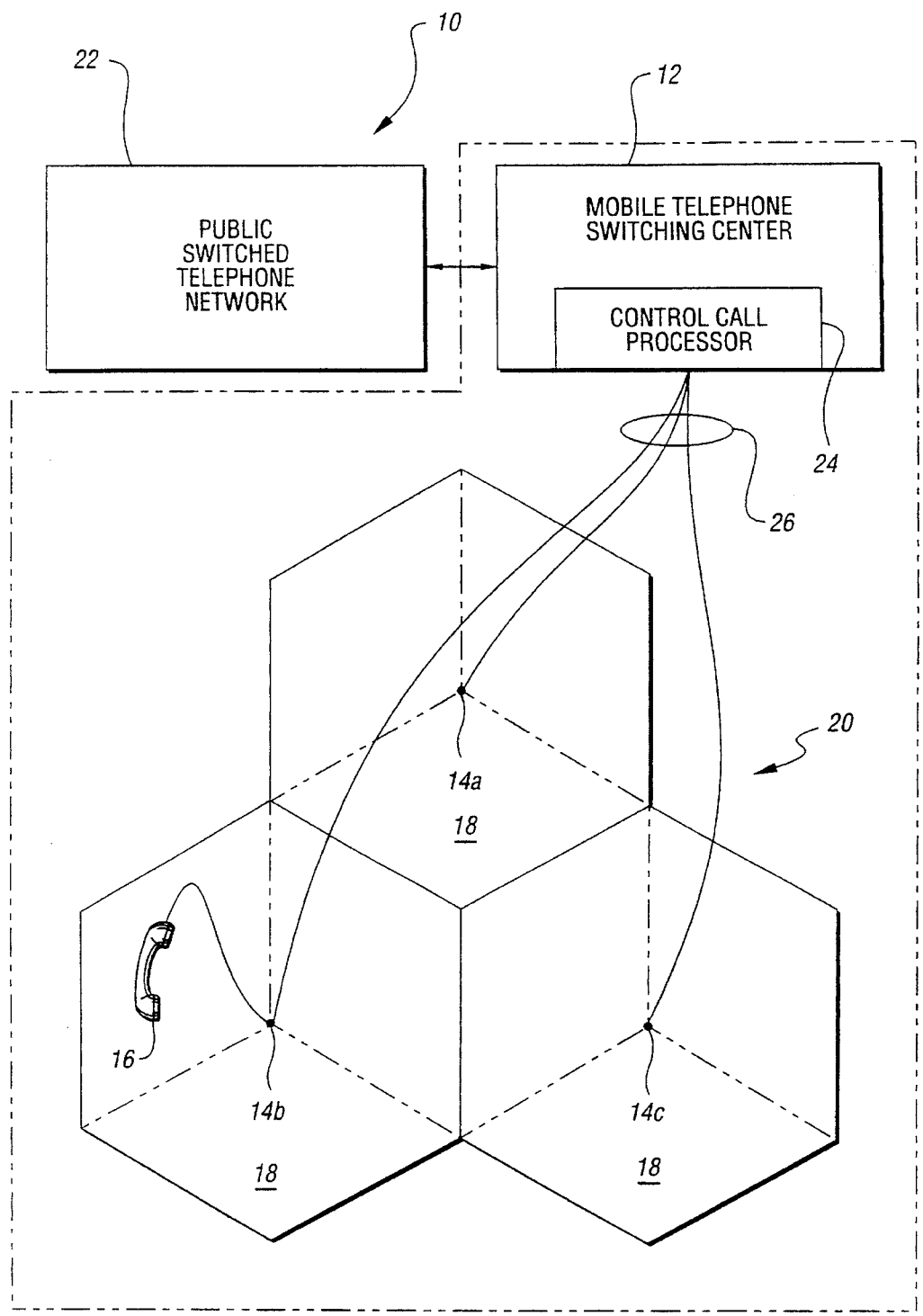
FIG. 1 is a generalized schematic diagram of a prior art cellular telephone system.
Figure 2:
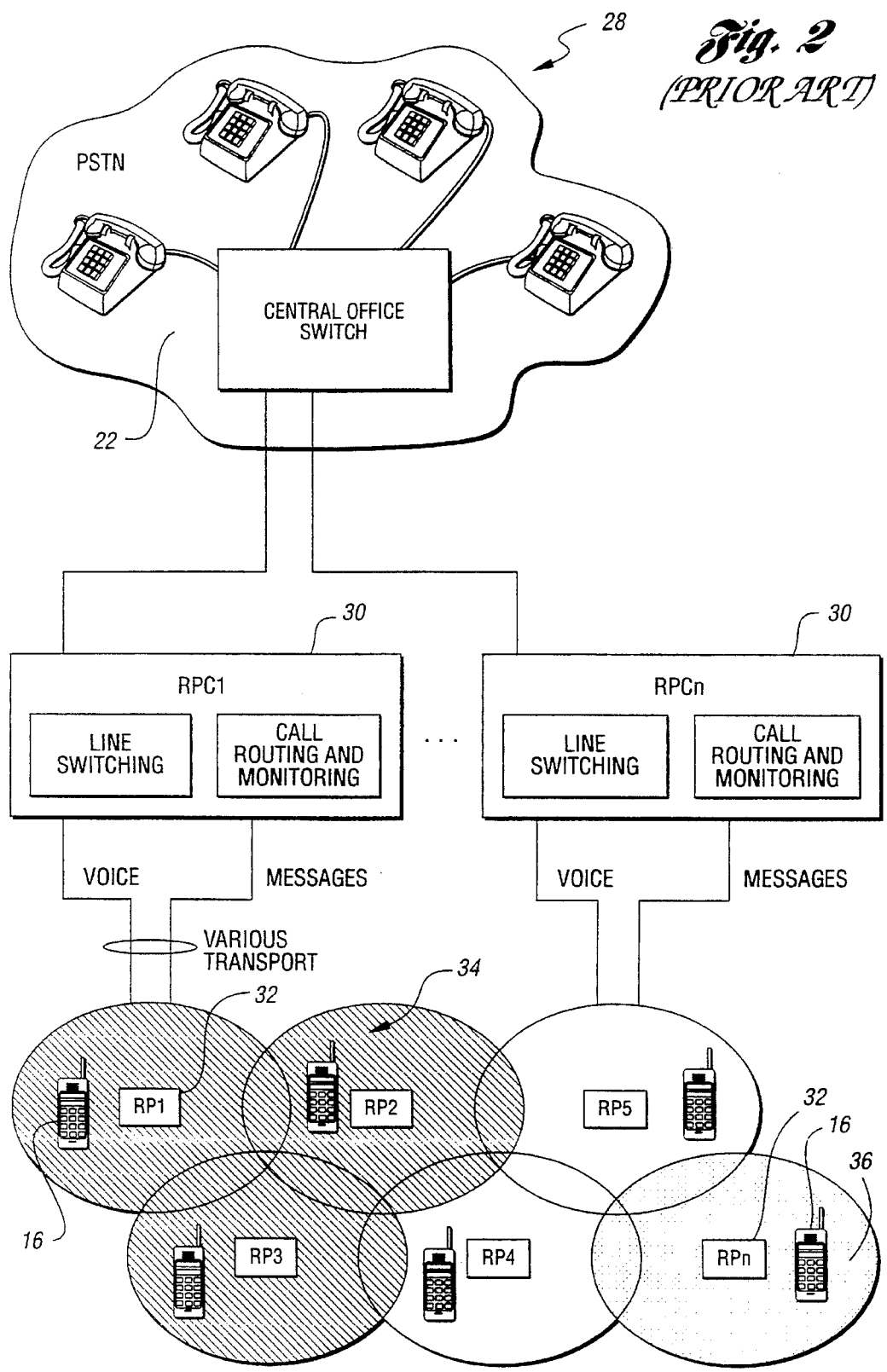
FIG. 2 is a generalized schematic diagram of a prior art Personal Communications System (PCS)
Figure 3B:
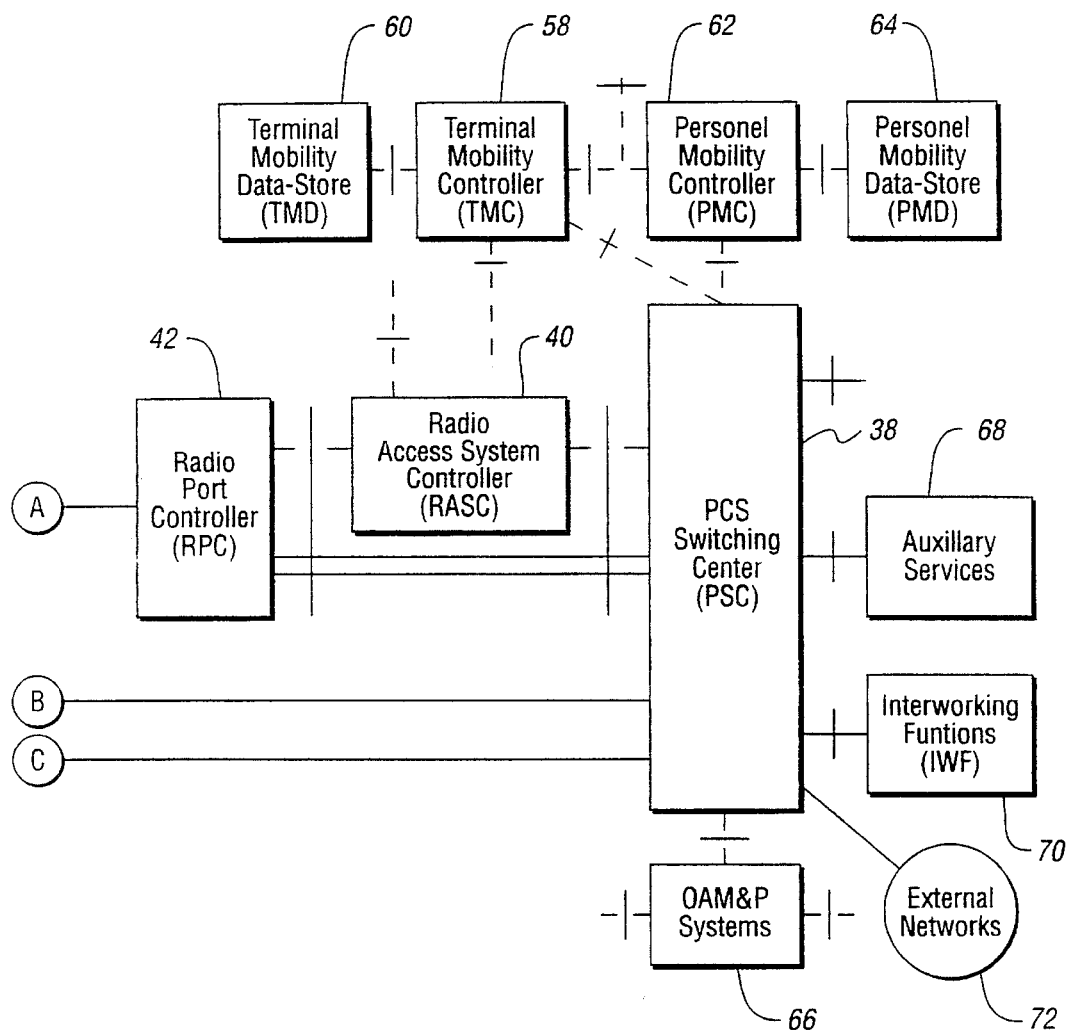
Figure 4:
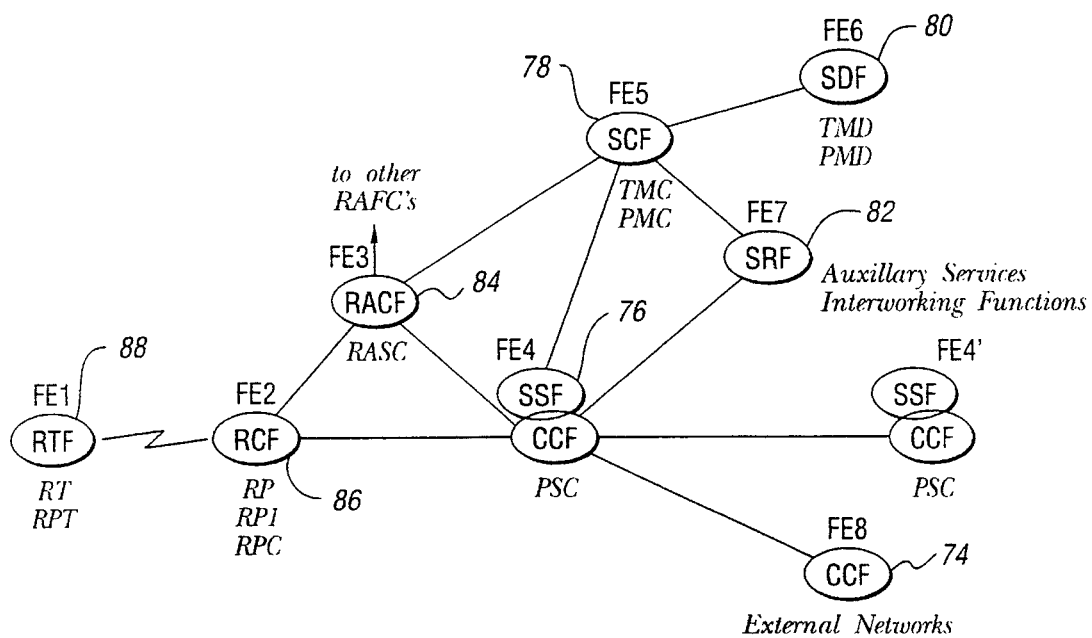
FIG. 4 is a unified functional model of the system of FIGS. 2 and 3.

A location databank 126 which is provided in electrical communication with Intelligent Peripheral 124 is operative to store real-time RF measurements for Radio Port 110 and/or cellular base station connected to cellular tower 112, including their link budgets. IP 124 is, however, operative to access the location databank 126 and determine and forward the location of the PCS mobile unit 110 or cellular mobile unit 116 to their respective control units, i.e., RPC 108 and MTSC 114, at the request of the SLP. As indicated above, in keeping with the invention, and with reference to the ANSI Stage 2 service architecture of FIGS. 3a–3b, the SLP can be used to embody the functions of the TMD 60, and/or the TMC 50 and/or PMC 62 and/or PMD 64 and/or RASC 40.

Figure 7:
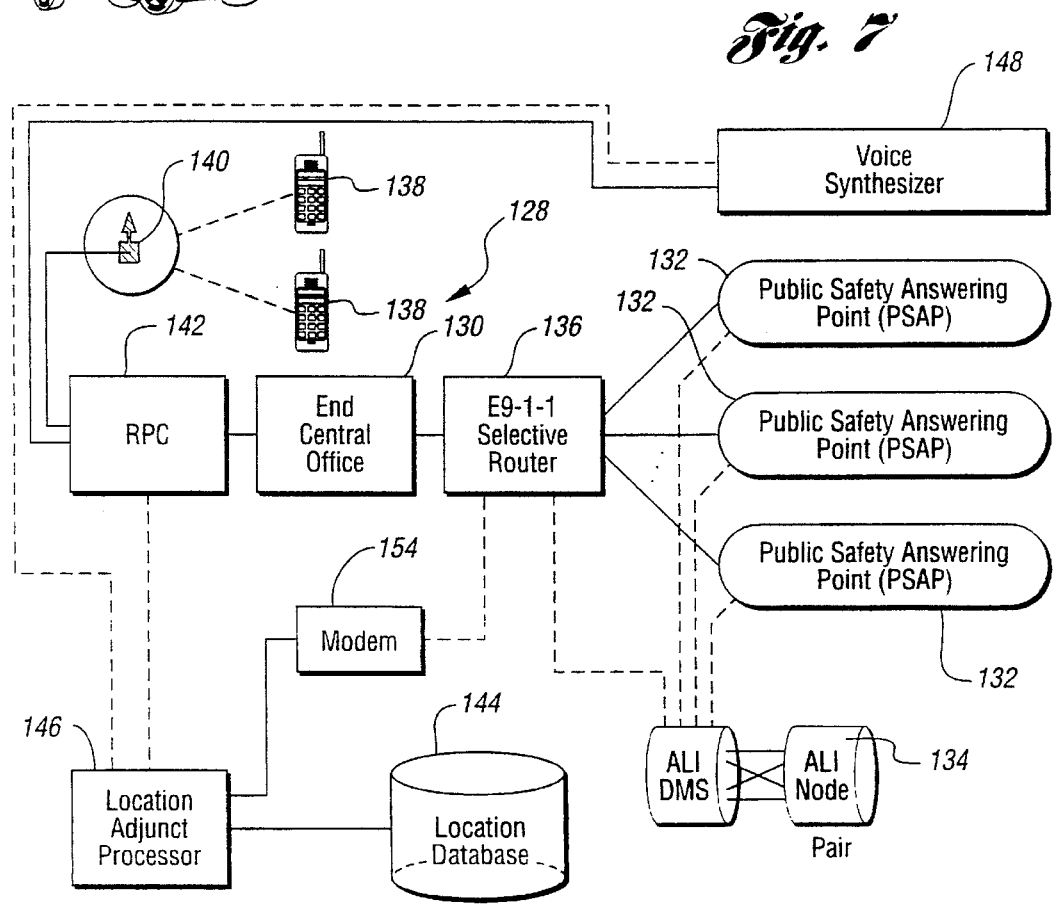
FIG. 7 is a schematic diagram of a third embodiment of the positioning system of the present invention adapted for use with an E9-1-1 selective router and a Public Safety Answering Point (PSAP)

Referring now to FIG. 7 of the drawings, another alternative embodiment of the system of the present invention is shown and designated generally by reference numeral 128. Location transport system 128 is again adapted for use in the Public Switched Telephone Network (PSTN) and includes at least one End Central Office 130 which is provided in electrical communication with a plurality of Public Safety Answering Points (PSAPs) 132 and an Automatic Location Identification/Data Management system (ALI/DM) database 134 via an Enhanced 9-1-1 (E9-1-1) selective router 136. Note that in the case of a cellular based wireless system, an alternative is that the End Central Office can be a PCS mobile switching center or mobile telephony switch office or center. The location transport system 128 is operative to route E9-1-1 calls from mobile units 138 such as radio personal terminals and, like the above embodiments, includes a plurality of base stations such as Radio Ports 140. Each of the Radio Ports 140 is assigned a pseudo directory number which is uniquely associated with it. This number is stored in the ALI/DM database 134 along with its location. Each of the radio ports 140 is operative to receive calls originating from one or more of mobile units 138 over air interface channels.

The system similarly includes a control unit 142 which as referenced above may be an MTSC when used in a cellular telephone network or a RPC or RASC, etc. when used in a PCS system as shown. Control unit 142 is operative to receive calls forwarded by mobile units 138, temporarily suspend call processing, and generate a call information request signal. A location databank 144 is also provided which is operative to store real-time RF measurements for each of the base stations 138, including its link budget. Finally, a LAP 146 is provided in electrical communication with location databank 144 and control unit 142.

As in the previous embodiments, the LAP 146 is operative to receive a call information request signal, access the location databank 144 and determine and forward the location of a mobile unit 138 to the control unit 142. Unlike the above embodiments, however, in this embodiment, the call will thereafter be forwarded to one of the PSAPs 132 in accordance with the pseudo directory number or RPID or geographic phone number associated with the corresponding base station along with its determined location and the location of the mobile unit 138 that originated the call.

Significantly, the above location information, i.e. the determined location of the mobile unit and the location of the corresponding base station may be forwarded to the PSAP 132 as a text description, video description, data point description or any other suitable informative means. A voice synthesizer 148 or other means for selective emission of prerecorded human voice phrases may also be provided in electrical communication with PSAPs 132 which is operative to audibly announce the location of the mobile unit 138 that originated the call. In operation, voice synthesizer 148 will announce location to a PSAPs 132. In addition, the call will be routed to the correct PSAP 132 and the base station's location will be displayed on the PSAP terminal, thus requiring no new equipment or functionality.

As those skilled in the art will recognize, wireline 9-1-1 calls are routed to the correct PSAP 132 via a TN/ESN translation in the E9-1-1 selective router 136. Each directory number (or terminal number) is associated with an emergency service number, which in turn is associated with a trunk group terminating to the correct PSAP. The location of the directory number is determined by the E9-1-1 selective router 136 via a database look up in the ALI/DMS (Automotive Location Identification/Data Management System) database 134. The ALI/DMS stores the location of each directory number, allowing the E9-1-1 selective router to forward this location to the PSAP.

Because wireless handsets, i.e. mobile units 138, do not contain an entry in the TN/ESN translation or the ALI/DMS system, wireless calls must be switched through the end central office/PCS switching center 130 using a pseudo directory number uniquely associated with the base station 140. For purposes of the present invention, each of these pseudo directory numbers will be stored in both the TN/ESN and the ALI/DMS systems. This will allow for the base station's location to be displayed at the PSAP 132, while the location of the mobile unit 138 and callback number is announced using the voice synthesizer 148 or similar means.

In the above voice synthesis approach, after PSAP answer supervision, but before PCS caller receipt of PSAP answer supervision, an in-band voice synthesizer device 148 provides the location information. The device temporarily bridges on to the forward channel, announcing location to the PSAP attendant, while the PCS caller 138 hears ringing tones. Applicants contemplate that a location announcement would take between 5–8 seconds, which at present appears to be a reasonable amount of time. This voice synthesis alternative would require a new PCS call-control function. After receipt of the PSAP answer supervision signal at the location calculation point, this signal would be temporarily stored in abeyance while the voice synthesizer 148 outputs the location information to the PSAP 132. Alternatively, the PCS caller may be allowed to hear the location information during its emission.

As a further alternative, either the PSAP attendant or PCS caller may press one or more Dual Tone Multi-Frequency (DTMF) keys, prompts or numbers during the voice connection which is monitored by the location processor. Upon detecting the presence of these numbers, a new location calculation is made and subsequently announced to either or both of the PSAP attendant and the PCS caller parties. Such use may be required, for example, where the transmission of the original location information was not properly received due to interference or the like or where for other reasons, a confirmation of location position is desired.

Figure 8:
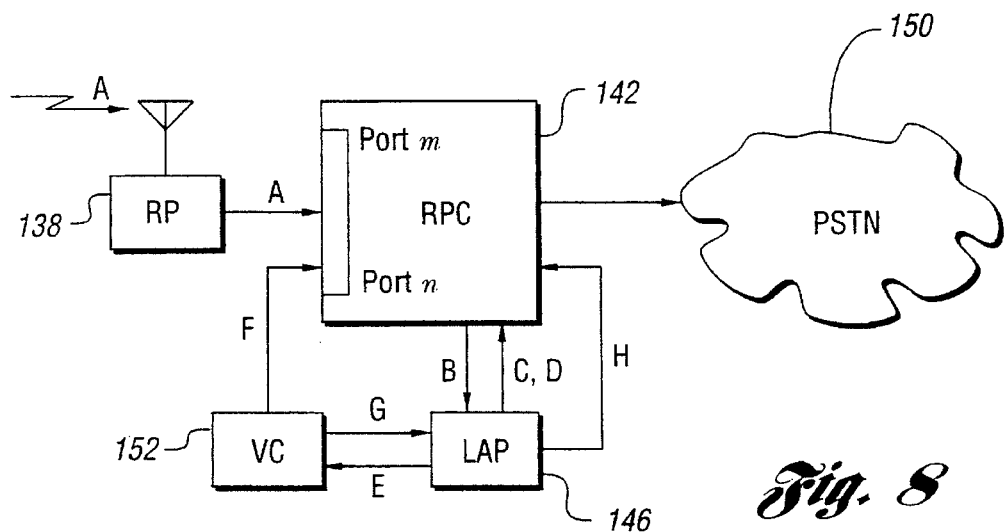
FIG. 8 is a schematic diagram of the process flow of an in-coming E9-1-1/location call request in accordance with the embodiment of FIG. 7.

A high-level voice synthesis implementation is shown, for example, in FIG. 8 of the drawings. As shown by the process flow, an in-coming E9-1-1/location call request (A) is received by Radio Port 138 and forwarded to the control unit (RPC) 142. Thereafter, a trigger signal (B) is generated in the RPC 142 to inform the LAP 146. The RPC 142 suspends the call. LAP 146 thereafter performs the location estimate and generates a signal (C) instructing the RPC 142 to forward the call request to the PSTN 150 and PSAP 132.

Still referring to FIG. 8, the LAP 146 thereafter generates a request signal (D) seeking a conference bridge between the incoming port (m) and the Voice Circuit (VC) 152 port end. LAP 146 further directs VC 152 to generate an announcement signal (E) announcing the location information (e.g., latitude and longitude). Next, VC 152 plays the synthesized latitude and longitude (F) as well as an error estimate for receipt by RPC 142. VC 152 further provides LAP 146 with a completion notification (G). Finally, LAP 146 generates a signal (H) instructing RPCU 142 to connect the end user with the PSAP 132 or PSTN user.

Applicants further contemplate that location information may also be provided to control unit 142 and ultimately a PSAP 132 through the use of a modem 154 connection to LAP 146 and selective router 136 as shown in FIG. 7. In this manner, an ASCII modem signal tone burst would be used, in which case special CPE modifications would be required to decode pseudo in-band location information and present it to the PSAP attendant. The tone burst could be sent between the first and second ring at the PSAP 132 (if this information space is not already in use), or immediately after PSAP answer and also before ringing tones cease from the PCS caller's perspective—some call control answer supervision and delay would also be needed in this case.

Still further, applicants contemplate the transfer of location information from the LAP to the PSAP 132 or similar receptor, such as a police station, hospital, etc. via a broadband network. The broadband network may be comprised of a variety of point-to-point or switching devices, for example, a point-to-point cable modem using FDDI between two cable modems and a IEE 802.3 ethernet interface or similar means between the LAP 146 and the cable modem on the near end and a similar interface between the cable modem and the PSAP interface or similar means.

Still further, applicants contemplate the utilization of transaction-based or similar data circuit techniques to transport PCS caller location information to the PSAP 132. The system may also be used to provide location transport along with other desired information, i.e., charts, schematics, etc., between one or more users, one or both of which may be mobile units.

Yet still further, applicants contemplate that each of the above positioning systems may be modified for use with the present invention such that location information may be provided directly to the mobile unit user in addition to or instead of the PSTN/PSAP attendant. For example, when using a Personal Digital Assistant (PDA), a user may desire his or her location and may simply call a specified telephone number which will provide the PDA in communication with a location adjunct processor. The location adjunct processor will thereafter perform call location calculations based upon RF measurements in accordance with the teachings of the present invention and forward the resultant location information directly to the PDA whereupon it may be displayed or audibly announced.

The PLS Interface

In keeping with the present invention, an Application Programming Interface (API) is also provided to trap desired calls based upon recognized bit patterns. As shown in FIG.

9, when used in a Personal Communications Network to trap emergency calls, for example, the PLS location processing interface will operate as follows: First, before any call processing, the LAP will send a Trap__Calls__Request message 156 to the RPC for each call type the LAP wishes the RPC to trap. The message will contain a bit pattern specifying the call type, and a flag specifying whether or not the RPC should suspend the call while the LAP is determining location. When a caller makes an emergency call, the call will be forwarded 158 to the nearest available RP. Upon receipt, the RP will similarly forward the call 160 to the RPC.

When the RPC receives a call type that matches a pattern specified in a previous trap calls request message (an emergency call in this example), the call will be suspended and a Trap__Satisfied message 162 will be sent to the LAP containing the call type, the radio port ID that received the call, and a transaction ID that the RPC and LAP will use during the remainder of this location processing.

Thereafter, the LAP will send a Get__SU Data request 164 to the RPC. The RPC uses the transaction ID to identify the particular subscriber unit, i.e. mobile unit, and sends a layer 2 REQ__SU__RF data message 166 to the Subscribing Unit (mobile unit). Upon receipt of this message, the LAP will send a GET__NRPL__Request to the RPC 168 to obtain a list of the neighboring Radio Ports surrounding the mobile unit. Upon receipt of the Get__NRPL request message 168, the RPC will send a Get__NRPL__Reply 170 to the LAP containing a list of Radio Port IDs and each port's status and operating frequency. Next, the LAP will send a Get__Uplink__Data__Request 172 to the RPC for each radio port in the neighboring radio port list. The RPC will then send a Get-Uplink__Reply 174 to the LAP as well as a layer 2 REQ__RP__RF__Data message to each Radio Port in the neighboring Radio Ports List specifying the particular mobile unit and its current frequency.

Each radio port will thereafter instantaneously jump to the mobile unit's frequency, take the appropriate RF measurements (RSSI, WER, QI, TD, etc.) and report the results to the RPC via a layer 2 RP__RF__Data message 176. The RPC will thereafter forward the radio port measurements to the LAP by sending multiple Get__Uplink__Data__Reply messages 178.

Next, the mobile unit sends multiple layer 2 SU__RF__Data messages 180 to the RPC, one for each entry in its mobile unit/handset table similar to that shown below:

| MOBILE UNIT/HAND SET TABLE | | | |
|---|---|---|---|
| RPID | RSSI | WEI | QI |
| →1 | −65 | 1 | 20 |
| 3 | −75 | 5 | 12 |
| 4 | −80 | 15 | 5 |

A table similar to the above mobile unit/handset table, is contemplated by Applicants to reside in the mobile unit. This table contains a list of RPs that the handset can "hear", i.e., neighboring base stations, along with the up-to-date downlink measurements. There is also an indication of which RP the mobile unit is currently communicating with. As shown by way of example in the above table, RPs 1, 3, and 4 are neighboring Radio Ports. The mobile unit is also currently communicating with RP 1, as designated by the "→" symbol.

The measurements stored in the mobile unit only represent the downlink signals—those signals that the handset/mobile unit receives from the RP/base station. In order to achieve a highly accurate location estimate, a similar table is contemplated to be needed which represents the uplink signals.

In operation, the neighboring Radio Port table is stored in the LAP and is populated during a location call. Upon notification of a location call, the LAP requests the RPC for neighboring Radio Port measurements. The RPC then sends messages to the RPs in close proximity to the RP that is communicating with the mobile unit. Each RP that receives this message temporarily switches to the frequency that the location mobile unit is communicating on. This frequency shift allows the RP to gather the uplink signals. The RP then sends the uplink measurements to the RPC. The RPC then forwards these measurements to the LAP.

An example neighboring Radio Port table is shown below.

| NEIGHBORING RADIO PORT TABLE | | | | |
|---|---|---|---|---|
| RPID | RSSI | WEI | QI | Operational Status |
| 1 | −60 | 6 | 10 | In Service |
| 2 | — | — | — | Out of Service |
| 3 | −75 | 20 | 12 | In Service |
| 4 | −90 | 41 | 28 | In Service |

As seen, the neighboring Radio Port table is nearly identical in structure to the mobile unit/handset table, with one additional field. The LAP needs to know the operational status of all neighboring RPs. If an RP is out of service, the LAP must be aware of this, as this could greatly affect the location processing. For example, FRP #2 is located very close to the RP #1, but is currently out-of-service, the LAP must know to exclude this RP from the real-time location processing.

Figure 9:
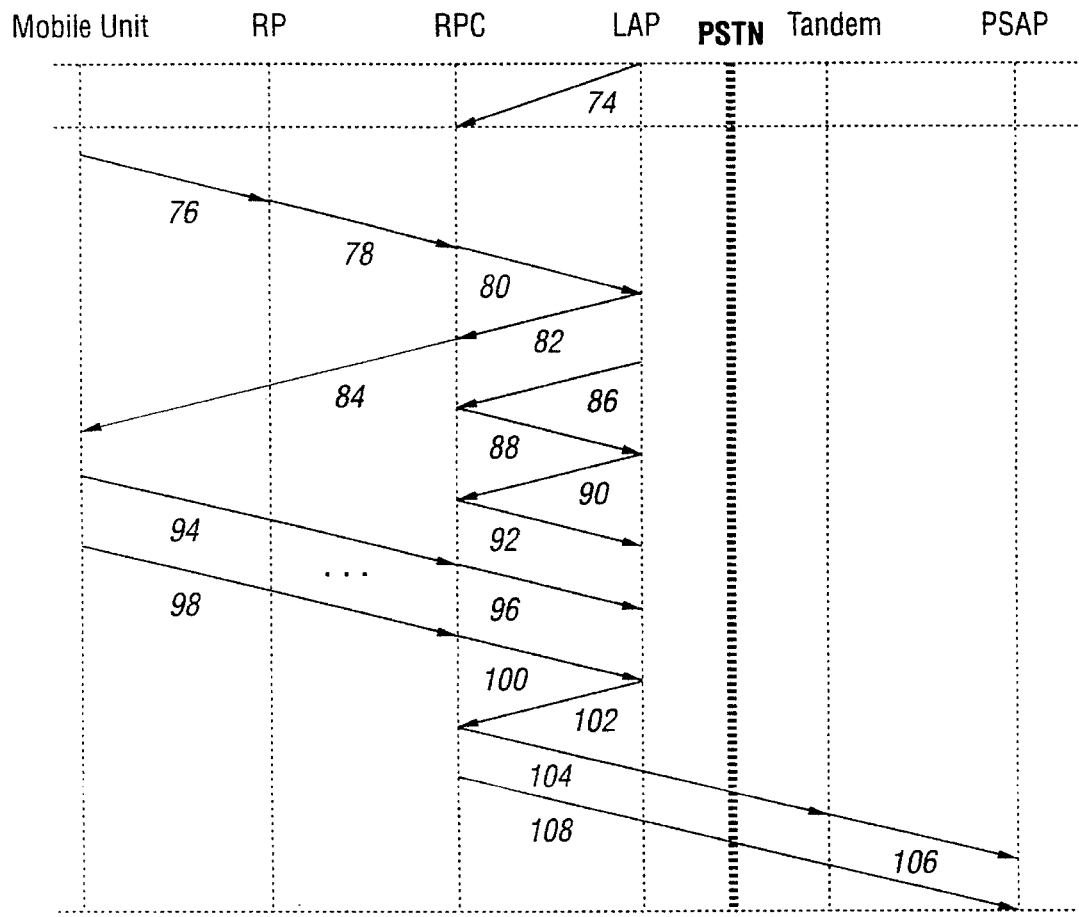
FIG. 9 is a flow diagram of the application programming interface of the present invention.

Referring still to FIG. 9 of the drawings, following a generation of multiple layer 2 SU__RF__Data messages 180 to the RPC, the RPC will forward the mobile unit measurements to the LAP by sending multiple Get__SU__Data__Reply messages 182. Thereafter, the LAP will send SU__Location to the RPC 184. The RPC will resume the call and forward the same to the PSTN (9-1-1) tandem switch. The tandem will perform selective routing and will forward the call to the PSAP 132. Finally, the RPC will send location, for example via voice synthesis, to the PSAP 132.

Figure 10:
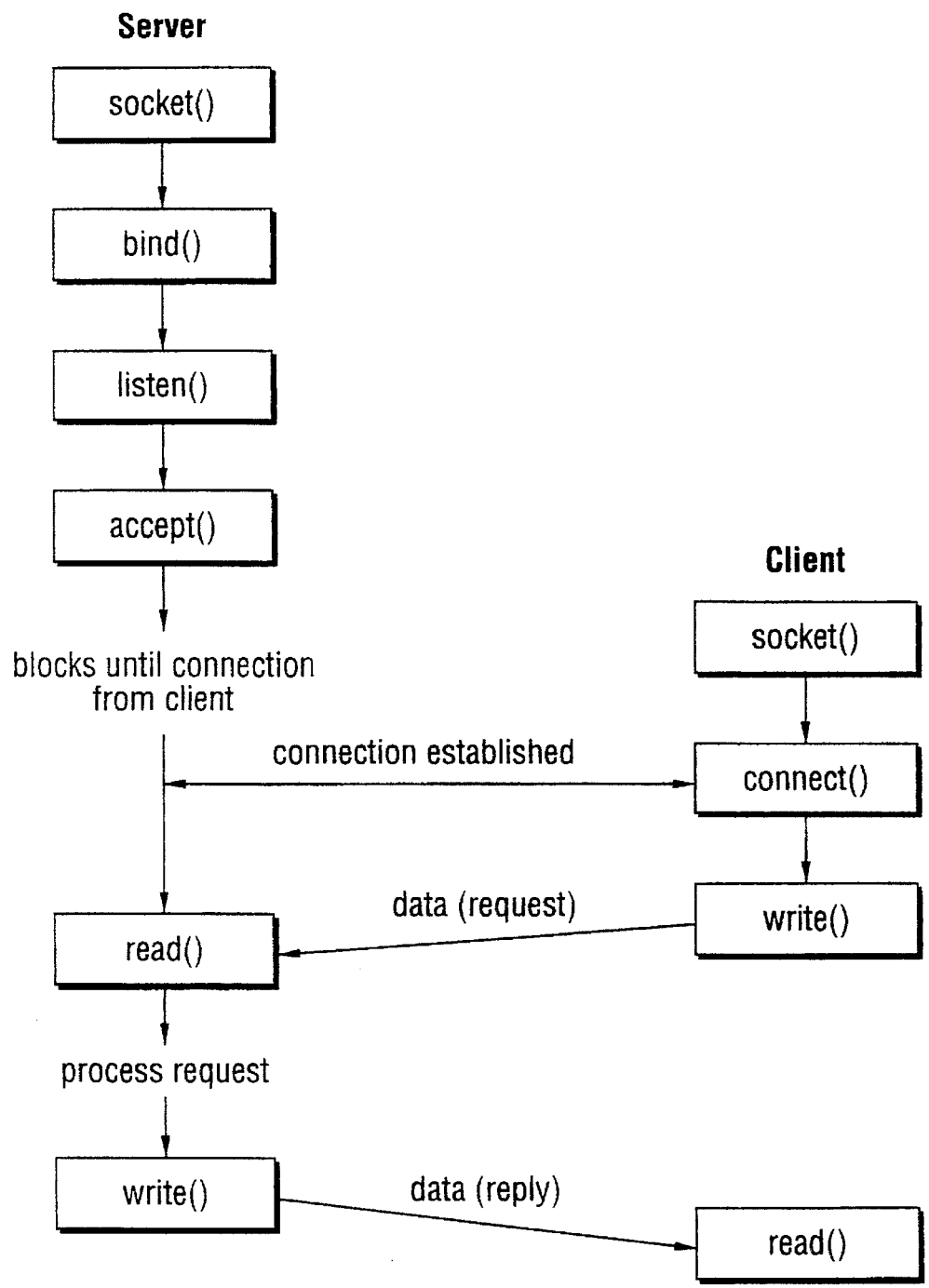
FIG. 10 is a time-line of the typical scenario for a connection-oriented transfer utilizing the API of FIG. 9.

Because the location application may not reside in the RPC (Control Unit) hardware, a protocol that supports inter-machine communication is required. A common, simple and efficient choice is TCP/IP sockets, also known as internet stream sockets. FIG. 10 of the drawings illustrates a time line of the typical scenario that takes place for a connection-oriented transfer—first the server is started, then sometime later a client is started that connects to the server. Significantly, in this scenario, the RPC would act as the server and wait for the application to connect to it as its client. The TCP/IP sockets are fairly ubiquitous and are supported on a wide range of platforms.

Note that if a handover occurs during the above process, it will not be possible to perform the measurements since the mobile unit will no longer be in communication with the aforementioned radio port or base station. Therefore, an API trap instruction called LAP__HANDOFF__NOTIFY__REPLY message can be used as a way to notify the LAP that a hand off has occurred. Just after a handoff has occurred, this trap message can be used to extract the identifies of the new cell and radio communication channel information. Once this information is known, the location steps described above can be repeated at the new handoff area.

The specification below provides sample pseudo-code for the PLS-API. The pseudo-code would be implemented using the TCP/IP sockets or similar means discussed above.

```
typedef enum {
    LAP_CLASS = 0, /* message from LAP to RPC */
    RPC_CLASS = 1 /* message from RCPU to LAP */
} SENDER_CLASS;
typedef enum {
    LAP_CONNECT = 0,                        /*request to connect to RPC */
    LAP_TRAP_CALLS_REQUEST,                 /*request to trap calls by
                                             *certain characteristics */
    LAP_GET_SU_DATA_REQUEST,                /*request specific record from
                                             *RPC activity log */
    LAP_GET_NRPL_REQUEST,                   /*request neighboring radio port
                                             *measurements */
    LAP_GET_UPLINK_DATA_REQUEST,            /*request handset measurements */
    LAP_SU_LOCATION,                        /*lat/long of SU and geo data */
    LAP_HANDOFF_NOTIFY_REPLY,               /*acknowledge handoff notification */
    LAP_CREATE_CALL_REQUEST,                /*request RPC to initiate a call,
                                             *i.e. Emergency Alarm Call */
    LAP_HANDSET_ALERT_REQUEST,              /* request RPC to initiate a silent
                                             *handset alert */
    LAP_DISCONNECT,                         /*notify RPC that LAP process
                                             *is disconnecting */
    LAP_REPLY,                              /*generic acknowledgement message */
    LAP_MAX_MESSAGE
} LAP_MESSAGE_TYPE;
typedef enum {
    RPC_CONNECT = 0,                        /*request to connect to LAP */
    RPC_TRAP_SATISFIED,                     /*notify LAP of trapped call */
    RPC_GET_SU_DATA_REPLY,                  /*send record from activity log */
    RPC_GET_NRPL_REPLY,                     /*send neighboring radio port
                                             *measurements */
    RPC_GET_UPLINK_DATA_REPLY,              /*send handset measurements */
    RPC_HANDOFF_NOTIFY,                     /*notify LAP that handoff occurred */
    RPC_CREATE_CALL_REPLY,                  /*acknowledge create call request */
    RPC_HANDSET_ALERT_REPLY,                /*acknowledge handset alert request */
    RPC_DISCONNECT,                         /*notify LAP that RPC process
                                             *is disconnecting */
    RPC_REPLY,                              /*generic acknowledgement message */
    RPC_CALL_COMPLETE,                      /*tell LAP to stop location function */
    RPC_MAX_MESSAGE
} RPC_MESSAGE_TYPE;
typedef struct {
    unsigned short sender_id;               /*identifies the sender */
    unsigned short receiver_id;             /*identifies the receiver */
    SENDER_CLASS class;                     /*class of the sender */
    unsigned long message_num;              /*message number */
    unsigned short message_type;            /*message type */
                                            *(see LAP_MESSAGE_TYPE and
                                            *RPC_MESSAGE_TYPE) */
    unsigned short total_msg_length;        /*message length (bytes) */
    unsigned short total_numb_packets;      /*# packets in message */
    unsigned short this_packet_num;         /*this packet's number */
    unsigned short body_length;             /*body length (bytes) */
    unsigned short transaction_id:          /*identifies the call this message
                                             *is associated with */
} HEADER;
```

The packet is defined as follows:

```
#define MAX_BODY_LEN 2000
typedef struct {
    HEADER header;                          /*packet header */
    unsigned char body [MAX_BODY_LEN];      /*packet body */
} PACKET;
```

The format of the packet's message body is defined based on the message type. Those message types not explicitly listed send an empty message body.

```
typedef struct {
    unsigned int emergencyCall:1;
    unsigned int userLocationRequest:1;
    unsigned int handoffNotify:1;
    unsigned int emergencyAccessCall:1;
    unsigned int spareBits:12;
} CALL_TYPE;
```

-continued

```
typedef struct {
    int layerInd;
    struct CALL_TYPE callTypeBits;
    BOOLEAN suspendCallFlag;
}LAP_TRAP_CALLS_REQUEST_BODY;
typedef struct {
    int rpId;
}LAP_GET_UPLINK_DATA_REQUEST_BODY;
typedef struct {
    int latitude;
    int longitude;
    char address [256];
}LAP_SU_LOCATION_BODY;
typedef struct {
    int lapHandoffStatus;
}LAP_HANDOFF_NOTIFY_REPLY_BODY;
typedef struct {
    TBD
}LAP_CREATE_CALL_REQUEST_BODY;
typedef struct {
```

```
            TBD
    }LAP_HANDSET_ALERT_REQUEST_BODY;
    typedef struct {
        struct CALL_TYPE callTypeBits;
        int rpId;
    }RPC_TRAP_SATISFIED_BODY;
    typedef struct {
        int rpId;
        int RSSI;
        int WER;
        int QI;
    }RPC_GET_SU_DATA_REPLY_BODY;
    typedef struct {
        int rpId;
        int status;
        int frequency;
    }RPC_GET_NRPL_REPLY_BODY;
    typedef struct {
        int RSSI;
        int WER;
        int QI
    }RPC_GET_UPLINK_DATA_REPLY_BODY;
    typedef struct {
        int newRpcuId;
        int newRpId;
        int newLapId;
    }RPC_HANDOFF_NOTIFY_BODY;
    typedef struct
            TBD
    }RPC_CREATE_CALL_REPLY_BODY;
    typedef struct {
            TBD
    }RPC_HANDSET_ALERT_REPLY_BODY;
```

Location Processing

Each of the systems referenced above requires detailed location processing utilizing scaled contour shapes which are modeled based upon determined RF measurements for each base station. The location processing of the present invention focuses on the ability to predict and model RF contours using actual RF measurements, then performing data reduction techniques such as curve fitting techniques, Bollinger Bands, and Genetic Algorithms, in order to locate a mobile unit and disseminate its location. An example of a suitable software analysis tool is a program by Axcelis, Inc. termed "Evolver 2.0" This is an Axcelis spreadsheet program that can perform a genetic algorithm optimization of the parameters generated in the above curve fitting techniques.

Figure 11:
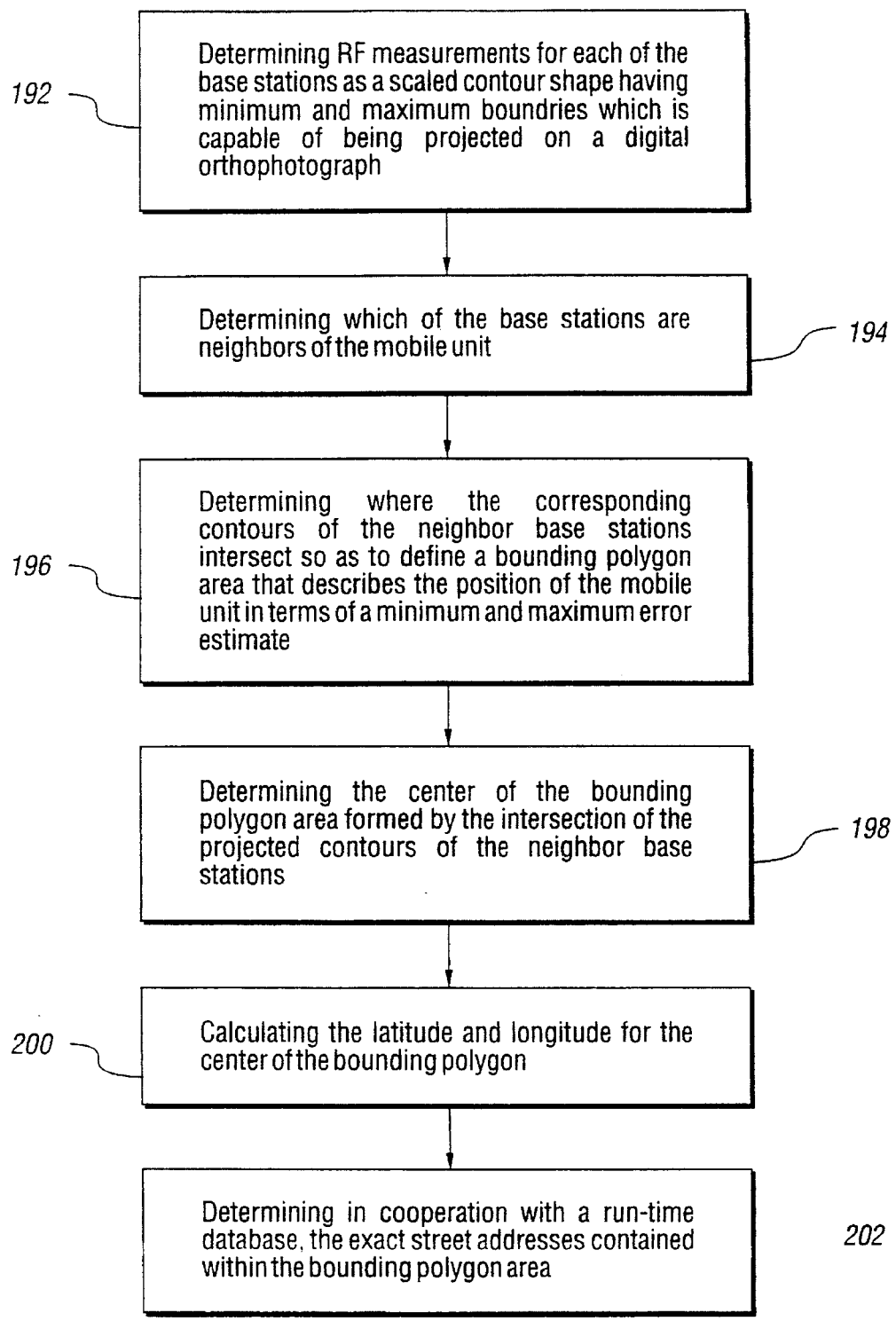
FIG. 11 is a generalized block diagram of the location method of the present invention.

More specifically, and with reference to FIG. 11 of the drawings, the method steps include modeling 192 determined RF measurements for each of the base stations as a scaled contour shape having minimum and maximum boundaries which is capable of being projected on a mapping system such as an orthophotograph which may be digitally recorded. Thereafter, it must be determined 194 which of the base stations can be "heard" by the mobile unit, i.e., which base stations are neighbors of the mobile unit. Once this information is known, it may further be determined 196 where the corresponding contours of the neighbor base stations intersect so as to define a bounding polygon area that describes the position of the mobile unit in terms of a minimum and maximum error estimate.

Once the above information is known, the center of the bounding polygon area formed by the intersection of the projected contours of the neighbor base stations may further be determined 198. From this information, the latitude and longitude for this center may be calculated 200 and there may be further determined 202 in cooperation with a location databank, the exact street addresses contained within the bounding polygon area.

As readily seen, a key component of the present invention is the ability to diagram and model the RF propagation loss from a given Base Station/Radio Port, for various RF measurement arc segments, which will define entire contours. As those skilled in the art will recognize, in theory, if the "free space" power loss is known for all useful distances in all directions from a base station, then individual circular power loss contour shapes may be drawn around the base station. Assuming two or preferably three base stations are neighbors of the mobile unit, then RF measurements may be used to determine location via intersecting contours. The particular shape of the contour intersections is the bounding polygon that describes the location, in terms of the maximum error estimate.

Unfortunately, the principle of free space loss rarely exists when attempting to predict base station coverage areas since the surrounding buildings, trees, traffic signs and other geographical "clutter" blocks transmitted signals. To account for these variables involved in propagation prediction, the present invention therefore utilizes a number of segmented models and analysis techniques for data reduction purposes. The resulting output becomes the location databank which consists of a collection of component databases, many of which may be designed on a per base station basis. The component databases may include a base station database, a prediction database, a measured RF database, a generic curve fit database, a Bollinger band database, equipment-specific corrections database, and a run-time database as described in further detail below.

Base Station Database

In keeping with the invention, the base station database provides a detailed list of the attributes of every installed and proposed base station. Applicants contemplate that this database would contain the following data elements:

1. Name or identification of base station.

2. Base station vendor name, model number, serial number.

3. Latitude (LAT), Longitude (LONG), or at least accurate street location detail for conversion to/from LAT and LONG, and Altitude (ALT) of physical placement of base station.

4. Base station transmitter default power, instantaneous power for each active transmission channel, and power range.

5. Antenna gain contours (if omni-directional, otherwise sector make-up, and gains within each sector).

6. Whether or not a distributed antenna scheme is used, and if so, placement (LAT, LONG, ALT) of all remote antennas.

7. Nearby surrounding obstructions (e.g., the mounting surface of the RP: is it on a metal wall, in an elevator, or hanging in free space).

8. Base station transmitter operating frequency band (licensed, unlicensed), and allowed frequencies.

9. Whether or not a duplicated transmitter is used, and if so, include the identifying characteristics of each transmitter.

10. The PSAP associated with each base station.

11. Type of air interface: protocol and signaling (e.g., PACS, CDMA, GSM, DECT, CDMA, PHS-PHP, IS-54, IS-95, PCS-1900, B-CDMA, etc.) This information should be derived from the base station vendor name, model number, and serial number. Any dual or multi-mode capabilities must also be known and characterized.

12. Base station antenna gain contour. This information could be derivable from knowledge about the antenna's characteristics and surrounding obstructions.

13. The control unit associated with the base station, neighboring communication network topology and the associated central office. This information may be derived from knowledge of the control unit and its connected central office at the time the wireless communication system is originally engineered. Nonetheless, the network topology may change, due to a variety of reasons. For example, future base stations may use a signaling protocol arrangement with their control unit such that the base station can be easily moved around without prior notification to a centralized work manager system. A control unit may automatically discover the addition/deletion or in/out change of a particular base station. To the extent this automatic capability exists, a forwarding event report message must be sent to a system associated with the location service. In cases where the control unit is associated with a PBX, foreign exchange circuit, or similar remoting facility, the identification and end-to-end topology circuit arrangements will be needed.

14. Frequency Assignment Characterization (FAC). This should be derivable from the RP vendor, make/model information. If the FAC is automatic, then a potential incompatibility may exist during the performance of the location function. Knowing these details, and/or having the ability to control the occurrences of frequency assignment, can resolve incompatibilities.

15. Current operational RP status. This information should be derivable from the wireless communication network OAM and P systems that should routinely receive current information about the in-service state of the base stations. This information is needed, for example, because a planned, but not in-service base station, or a faulty base station, could disturb the location algorithm, if this information is otherwise not known.

16. Traffic load characteristics of the base station and its superior network. This may be derivable from the network planning activity, base station model characteristics, and dynamic monitoring by OAM and P systems, or each base station. For example, if a base station needed to perform an emergency location function, it cannot be invoked because it is at 100% of capacity, with no possibility to shed "non-emergency" load, then other techniques may be applied.

Prediction Database

This is a planning database primarily populated by, and used to support/interact with base station site planners and installation engineers. In accordance with the invention, it is used primarily to predict coverage. The location function accesses this database in order to require a rudimentary understanding of intended coverage area of newly planned cell sites and their operational status. Using the various RF propagation models and special plane curves, propagation coverage will be predicted for all base stations by examining the placement of the base station, local street widths, and the surrounding clutter. This provides a quick, inexpensive estimate of each base station's coverage.

Measured RF Database

In keeping with the invention, the measured RF database consists of actual measurements taken from the area surrounding the base station. These measurements could be taken by technicians during base station site installation or any other collection technique. Both uplink (handset to base station) and downlink (base station to handset) measurements will be made for data such as Received Signal Strength Indicator (RSSI), Word Error Rate (WER), Quality Indicator (QI), and Time Differential. Each of these variables are known to those skilled in the art and will therefore not be discussed in further detail. These measurements will be recorded along with the exact location at which the measurements were taken. All measurements are made within an arc segment region as discussed in further detail below.

Generic Curve Fit Database

This database is contemplated for use in accordance with the invention when no equipment-specific data is required/available. The generic curve fit database is created in the following manner:

1. Using the measurements database, load the data for each measurement type (i.e. $RSSI_{down}$), per an arc segment region, and per a base station, into a curve fitting program. One such program known to applicants is Table Curve 2D distributed by Jandel Scientific Software. Using any random or pseudo-random method, "holdback" 15% of the data points from the curve-fitting exercise, to be used as verification points later. This process will produce an equation for each measurement type, per region.

2. Inspect the resulting graphs for each measurement. Measurements that produce smooth, well-fit curves will be noted.

Figure 12:
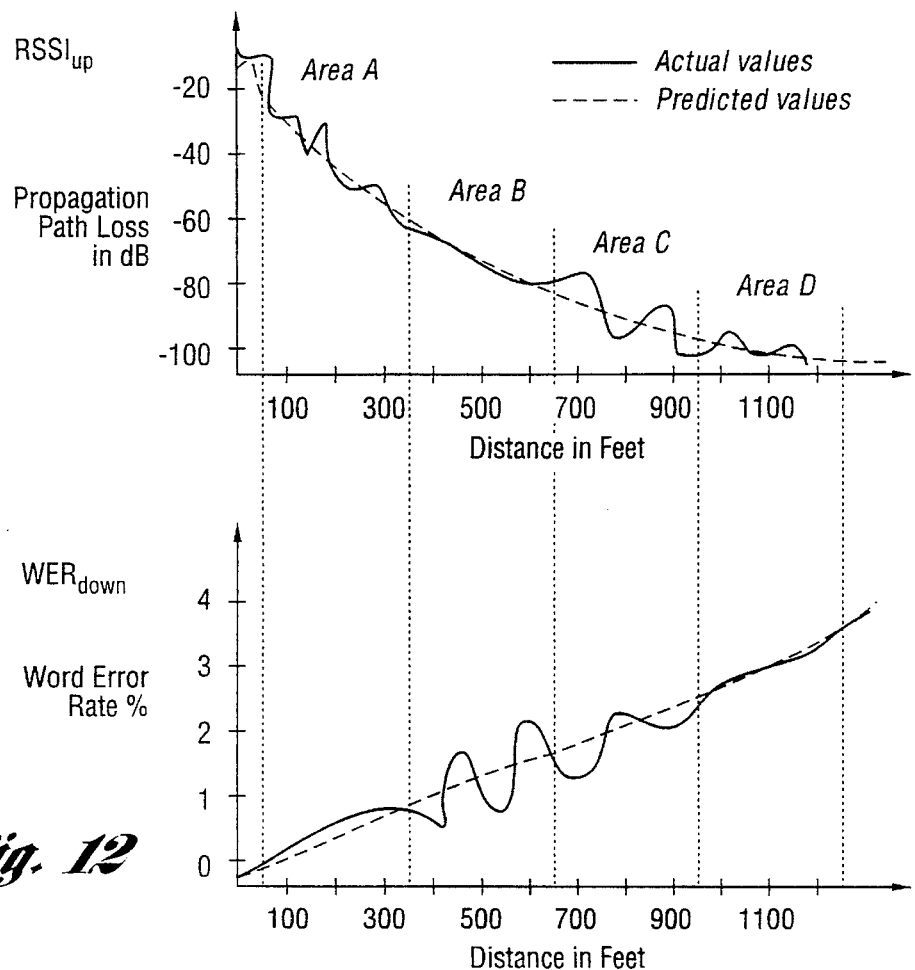
FIG. 12 is a representative curve fit graph obtained from the generic curve fit database used in accordance with the present invention.

3. Simultaneously inspect all graphs for a given region. If one measurement produces a much smoother graph than the others, determining location in that region will require only one parameter. Alternatively, there may be areas within the region that correlate well with some measurements and poorly with others. As shown in FIG. 12, for example, it can be seen that the correlation in area A is fairly good for WER and poor for RSSI. Similarly, the correlation in area B is good for RSSI and poor for WER. These graphs suggest that determining location will require multiple parameters. In the example of FIG. 12, WER would be used in areas A and D, RSSI would be used in area B, and another measurement would be used in area C.

4. Test the equations by using the data points that were excluded from step 1. If the results are satisfactory, go on to the next step. If the error-bounds are too large using the existing equations, it may be necessary to use genetic algorithms to enhance the predictive technique for the region. Genetic algorithms could be used here to simultaneously combine the six (or more) equations in every conceivable manner to produce the best fit.

5. Store the equations for each region in the location database for use during a location request, along with the error estimate.

By analyzing the surrounding characteristics for each model region (i.e. street width, distance from base station to nearest building, etc.) along with a corresponding location equation, it may be possible to reuse this information in a predictive manner for future base station installations. Applicants contemplate that this could reduce costly manual RF measurement testing.

Bollineer Bands

As known to those skilled in the art, the basic idea behind Bollinger Bands is to read data points and create a moving average and a moving standard deviation. The bands are determined by calculating the average of a certain number of data points plus and minus two times the standard deviation of the data. A "sliding window" is used for the volatility of the data. The optimal window size will vary with the condition of the data.

Figure 13:
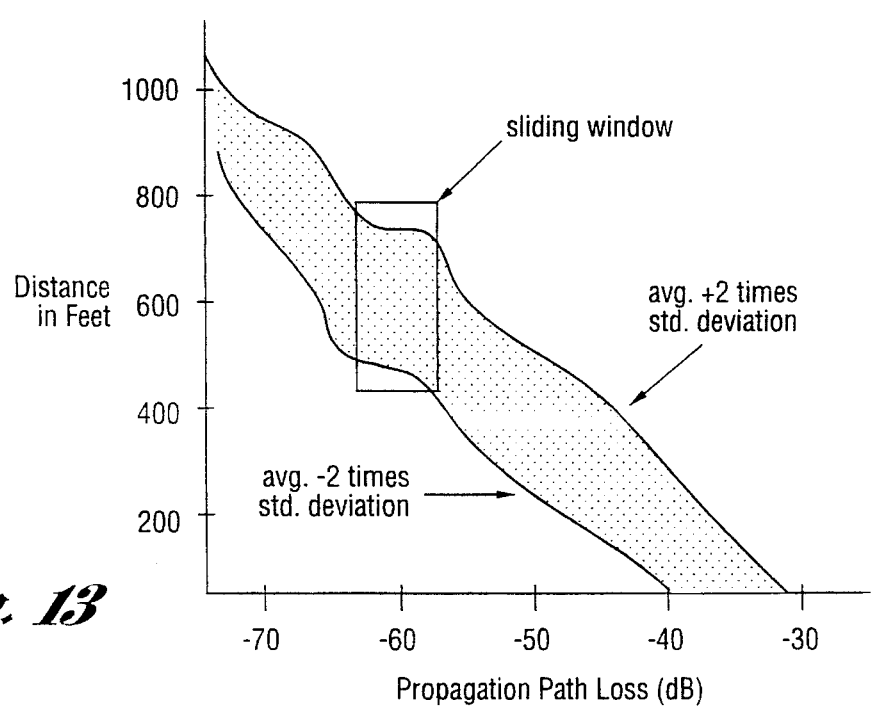
FIG. 13 is a schematic of typical data obtained when utilizing the Bollinger Band database in accordance with the present invention.

As shown in FIG. 13, Bollinger Bands provide: (1) the ability to handle discontinuities and vast multi-model, noisy search spaces; and (2) they optimize error wherever possible, i.e., wherever field measurements have a low volatility, then Bollinger Bands will generally have a low bandwidth, which results in a more accurate bounding polygon.

In accordance with the present invention and as explained in further detail below, RF measurements will be analyzed using the Bollinger band technique in the following manner:

1. Load the data for each measurement type (i.e. RSSI downlink), per arc segment region, into a program to calculate the sliding window average and standard deviation.

2. For each distinct measurement value (e.g. –70 Db, –71 Db, –72 dB, etc.), store the measurement value and the corresponding average distance (in feet) in both the upper and lower band (in feet), based on the sliding window.

Equipment-Specic Corrections Database

This database is contemplated for use with the present invention if vendor-specific, and/or model-specific equipment characteristics are available and are used in the areas of interest, which deviate from the generic curve fit database assumptions. For example, in GSM, different vendors use slightly different mapping or transfer functions, in relating true Word Error Rate, with the vendor's quantized indicator. It is anticipated that public, open standards will be defined, that mitigate the need for the Equipment-Specific Corrections Database. Data for this database would normally be provided from lab tests performed by mobile unit manufacturers, which are then used for correction purposes with respect to the generic curve fit database, and its assumed internal baseline standard.

Run-Time Database

This database is contemplated by Applicants to be stored directly in the format of the GIS software being used (e.g. map info or ARC/info). It is derived from the data reduction processes, for example, the curve-fitting in Bollinger Bands. Each arc segment per base station contains a number of entries. The first entry defines the independent variables used to calculate location within this arc segment. There is also one entry for each distinct measurement value of the independent variables selected (e.g. RSSI down=–70 dB, –71 dB, –72 dB, etc.) These entries are actually graphical objects (bounding polygons) that are selectable by the GIS software.

For example, with reference to FIG. 14 and the table below, assume the curve fitting in Bollinger Band analysis for base station 1 has determined that $RSSI_{up}$ is the best location predictor for arc segments 1, 2 and 3, while $WER_{down}$ is the best predictor for arc segments 4 and 5. The run-time database would contain the following entries:

| RUN-TIME DATABASE | |
|---|---|
| Arc Segment | Predictor Variable |
| 1 | $RSSI_{up}$ |
| 2 | $RSSI_{up}$ |
| 3 | $RSSI_{up}$ |

| RUN-TIME DATABASE | |
|---|---|
| Arc Segment | Predictor Variable |
| 4 | $WER_{down}$ |
| 5 | $WER_{down}$ |

In addition, the database would contain many bounding polygons per arc segment. FIG. 14 illustrates this concept for the five arc segments mentioned. In this Figure, the bounding polygons for $RSSI_{up}$ values of –70 dB, –71 dB and –72 dB are displayed for arc segments 1–3. Additionally, the bounding polygons for WER down values of 1.1% and 1.2% are displayed for arc segments 4 and 5. While only 2–3 bounding polygons per arc segment are displayed in the Figure, there would actually be many polygons to cover the entire range for variable being used.

The run-time database is displayed with one predictor variable per arc segment as shown above. The Position Location System (PLS) process will actually use more than one predictor variable per arc when a single variable does not reliably predict distance. The run-time database for each arc segment will be constructed by using the results of the curve fit and Bollinger band databases, and will actually consist of two tables. The first table will be used to construct a set of fuzzy logic rules, while the second table will provide a predicted distance value, along with a minimum and maximum boundary.

For example, if arc segment 1 of radio port 5 is predicted well by $RSSI_{down}$ for values of –40 dB to –70 dB, and $WER_{down}$ for values of 1% to 3%, the following entries would appear in the run-time database rule table:

TABLE 1

| Run-Time Database Rule Table | | | | |
|---|---|---|---|---|
| Radio Port | Arc Segment | Variable | Min Range | Max Range |
| 5 | 1 | $RSSI_{down}$ | –40 | –70 |
| 5 | 1 | $WER_{down}$ | 1.0 | 3.0 |

The second table for arc segment one would contain entries such as these:

TABLE 2

| Run-Time Database Values Table | | | | | | |
|---|---|---|---|---|---|---|
| Radio Port | Arc Segment | Variable | Value | Mean Dist | Min Dist | Max Dist |
| 5 | 1 | $RSSI_{down}$ | –40 | 100 | 0 | 200 |
| 5 | 1 | $RSSI_{down}$ | –41 | 120 | 20 | 220 |
| 5 | 1 | $RSSI_{down}$ | — | — | — | — |
| 5 | 1 | $RSSI_{down}$ | –70 | 500 | 400 | 600 |
| 5 | 1 | $WER_{down}$ | 1.0 | 400 | 350 | 450 |
| 5 | 1 | $WER_{down}$ | 1.1 | 440 | 390 | 490 |
| 5 | 1 | $WER_{down}$ | — | — | — | — |
| 5 | 1 | $WER_{down}$ | 3.0 | 800 | 700 | 900 |

Figure 15:
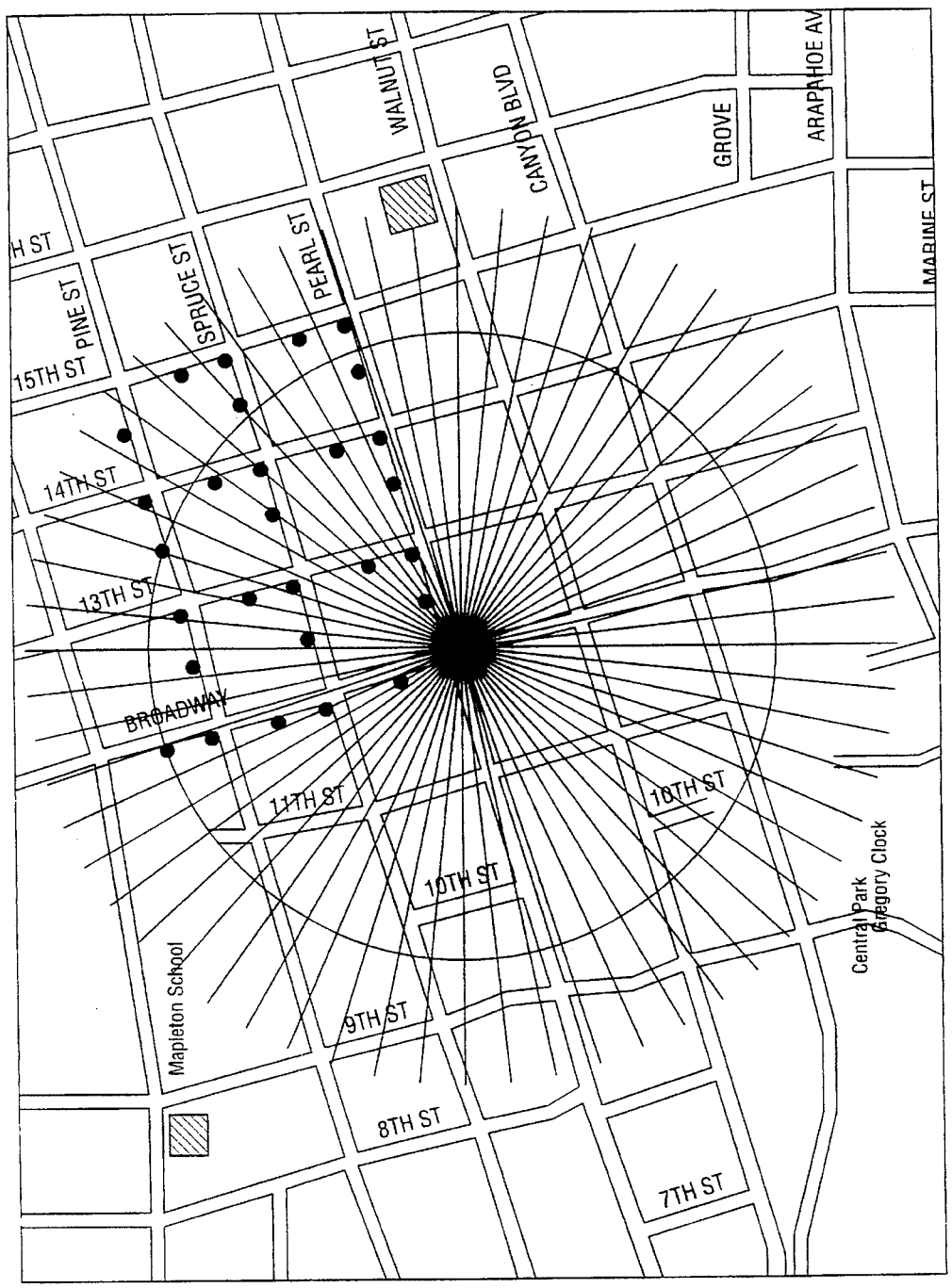
FIG. 15 is a schematic diagram of representative arc segments drawn around a radio port.

During a location request, the LAP would access the run-time database rules table and construct the following code to determine the caller's predicted distance from radio port 5 for arc segment 1:

Pseudo-code:

rule_1 = FALSE
rule_2 = FALSE
/* look for active rules */
if $-70 <= RSSI_{down} <= -40$ then
   rule_1 = TRUE
if $1.0 <= WER_{down} <= 3.0$ then
   rule_2 = TRUE
if rule_1 is TRUE and rule_2 is TRUE
   /* both rules apply, so we have to perform a weighted average
     using the difference between predicted max and min */
   weight_1 = $(RSSI_{down}max-RSSI_{down}min)/$
      $(RSSI_{down}max-RSSI_{down}min+WER_{down}max-WER_{down}mean)$
   weight_2 = $(WER_{down}max-WER_{down}min)/$
      $(RSSI_{down}max-RSSI_{down}min+WER_{down}max-WER_{down}mean)$
   /* reverse the weights because the one with the smaller
     difference is better and should be weighted more heavily */
   mean = weight_1*$WER_{down}$mean+weight_2*$RSSI_{down}$mean
   min = weight_1*$WER_{down}$min+weight_2*$RSSI_{down}$min
   max = weight_1*$WER_{down}$max+weight_2*$RSSI_{down}$max
else if rule_1 is TRUE
   use $RSSI_{down}$mean, min and max
else
   use $WER_{down}$mean, min and max The detailed steps of preparing the run-time database and thus the PCS location databank may be illustrated with reference to FIG. 15 of the drawings. FIG. 15 is a schematic diagram of a Radio Port that has arc-segments 204 of 6 degrees. The arc-segments create discrete sections of the area around the Radio Port. With these sections clearly defined, the RF behavior of the Radio Port can be characterized in each section independently. After the locations have been partitioned into arc-segments, a spreadsheet file can be produced for each arc-segment.

The preparation steps include the initial gathering of field data. The desired parameters ($RSSI_{up}$, $RSSI_{down}$, $WER_{up}$, $WER_{down}$, $QI_{up}$, $QI_{down}$, etc.) will be collected at locations surrounding the Radio Ports. In a preferred embodiment, these locations will be approximately 10 meters apart from one another. All measurements will be placed with location tags in a suitable spreadsheet file such as, for example, Microsoft Excel.

The locations will thereafter be partitioned into arc segments 204 as indicated above. In keeping with the invention, the locations need to be partitioned into arc segments 204 in order to accurately model the parameters around corresponding Radio Ports. After the data has been collected and partitioned into arc segments, a suitable curve fitting program such as TableCurve 2D will be used to curve-fit the data (distance versus each parameter) for each individual arc-segment. The software generates a list of functions that could possibly characterize the data and sorts the functions (best to worse) by means of lowest Fit Standard Error (FitStdErr).

Sometimes, the best fit (lowest FitStdErr) that the curve-fitting software packages produces is not the best fit for the RF data in terms of correlating with distance. There are many different examples of the software package fitting a curve to the data that is not physical (not possible in the RF environment). Some examples of non-physical fits are fits that swing into negative distances, fits that have high sinusoidal content, and fits that have many slope reversals or large swings in areas where few or no actual data points reside.

Figure 16:
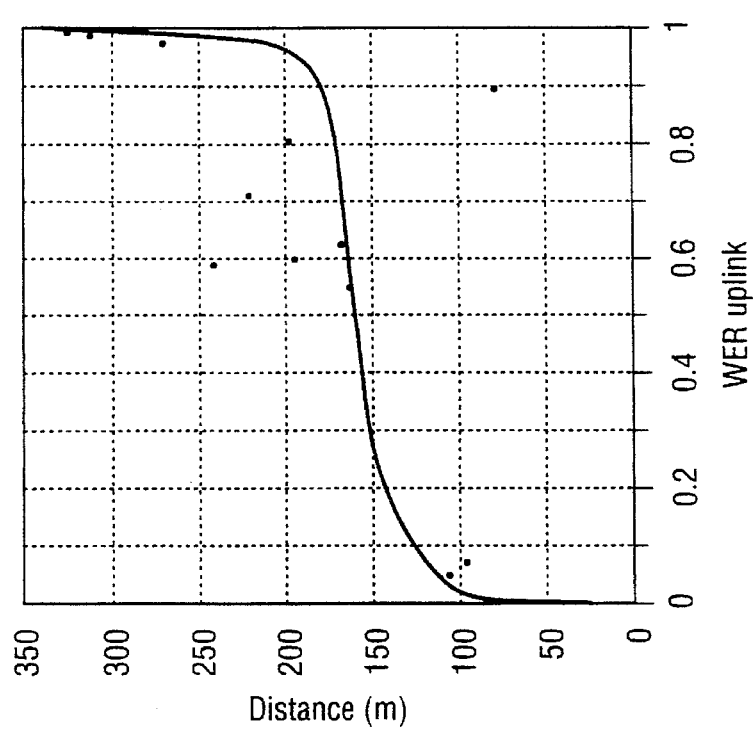
FIG. 16 is a schematic diagram of a first sample curve-fit data plot before and after a manual search.
Figure 16:
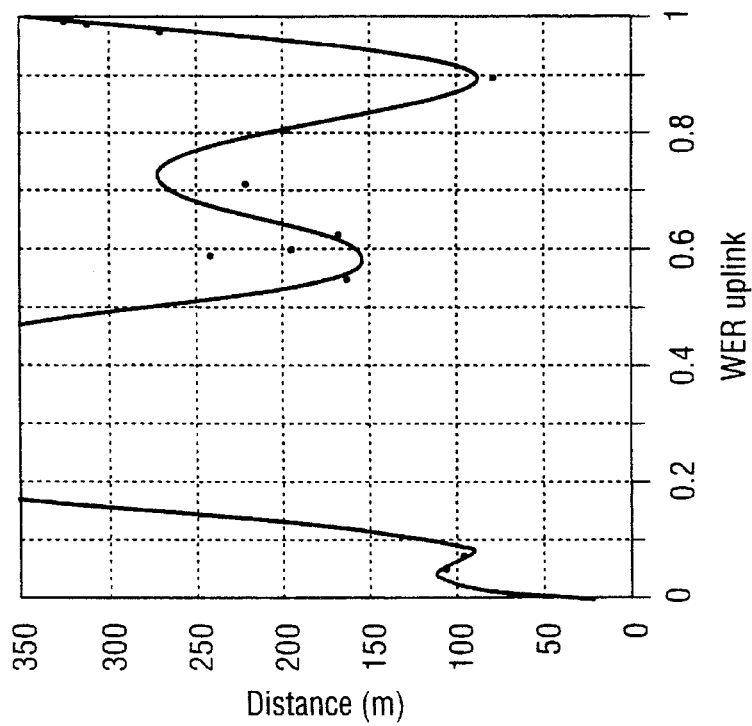

FIG. 16 illustrates two TableCurve 2D curve-fit on the same data. The plot on the left shows the curve-fit that the software package chose as the best fit (it is the fit with the lowest FitStdErr). One skilled in the art would recognize that the plot on the left is highly unlikely to be representative of the data because of the large swings where few data points lie. With the data from FIG. 16, a manual search for the most logical fit is needed. One skilled in the art would therefore search the fits until she found a fit that is more logical (like the fit on the right in FIG. 16).

Figure 17:
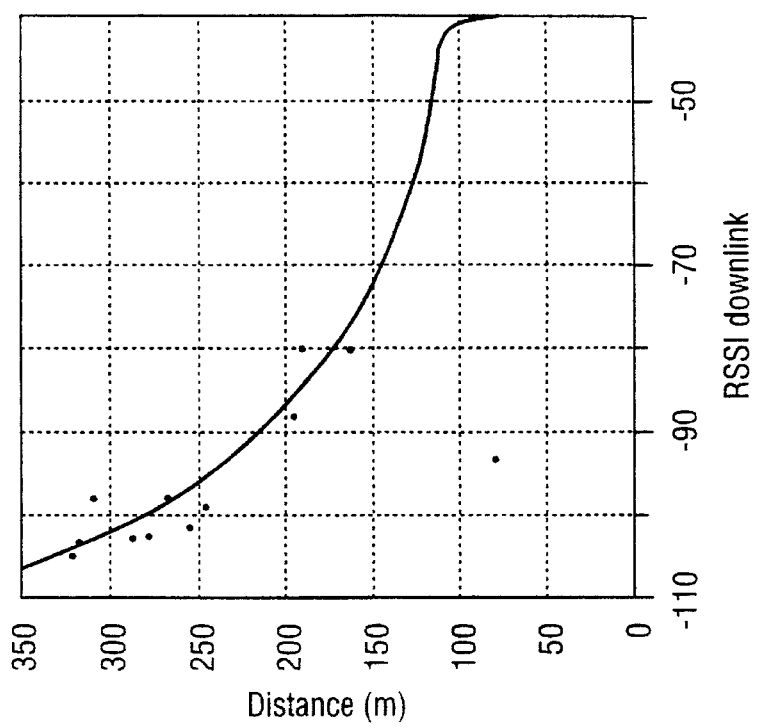
FIG. 17 is a schematic diagram of a second sample curve-fit data plot before and after a manual search.
Figure 17:
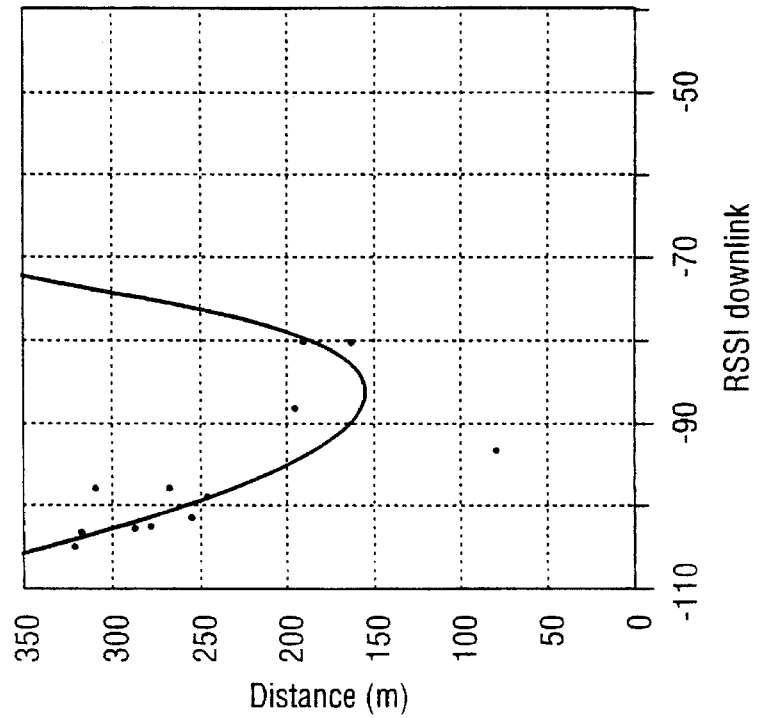

FIG. 17 provides another example of a TableCurve 2D fit that is not logical. The fit on the left has one swing to a very large distance (off of the top of the plot) in an area where there are no data points. The plot on the right is much more likely to describe the data accurately in the area where there are no data points, even though it has a higher FitStdErr than the plot on the left.

Figure 18:
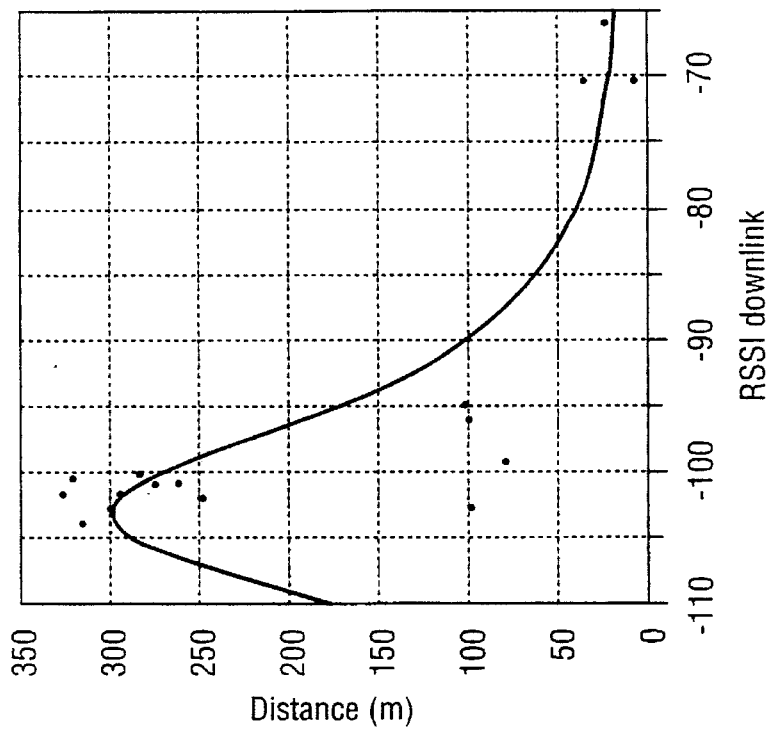
FIG. 18 is a schematic diagram of a third sample curve-fit data plot before and after a manual search.
Figure 18:
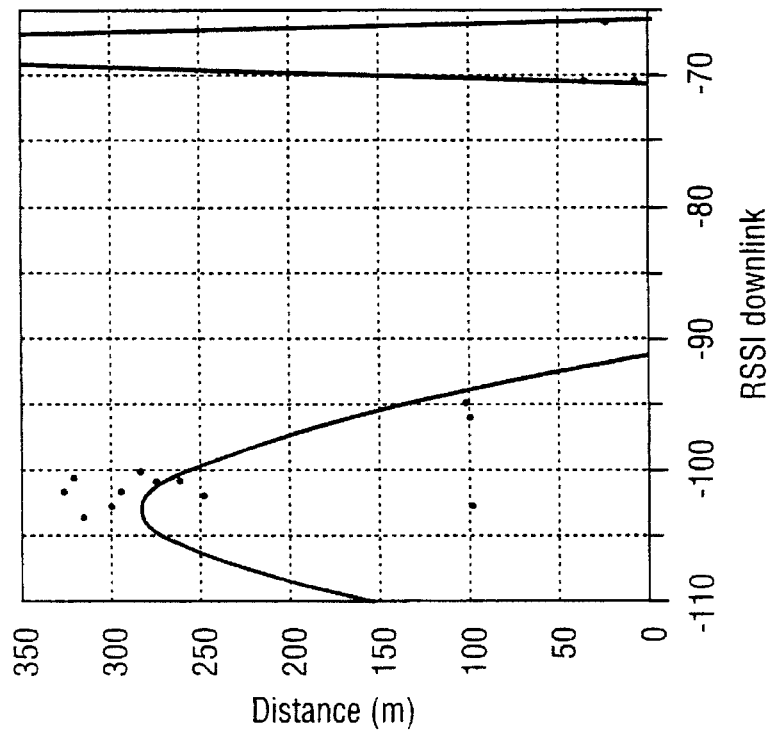

FIG. 18 illustrates yet another fit (left) that has a large negative distance swing (again, where no data points lie) and a sharp, large positive distance swing. In keeping with the invention, negative distances are not valid because they do not represent the RF environment properly. The sharp, large distance swing is not reliable because of the low number of data points in the area. The plot on the right has a much higher probability of being accurate.

Figure 19:
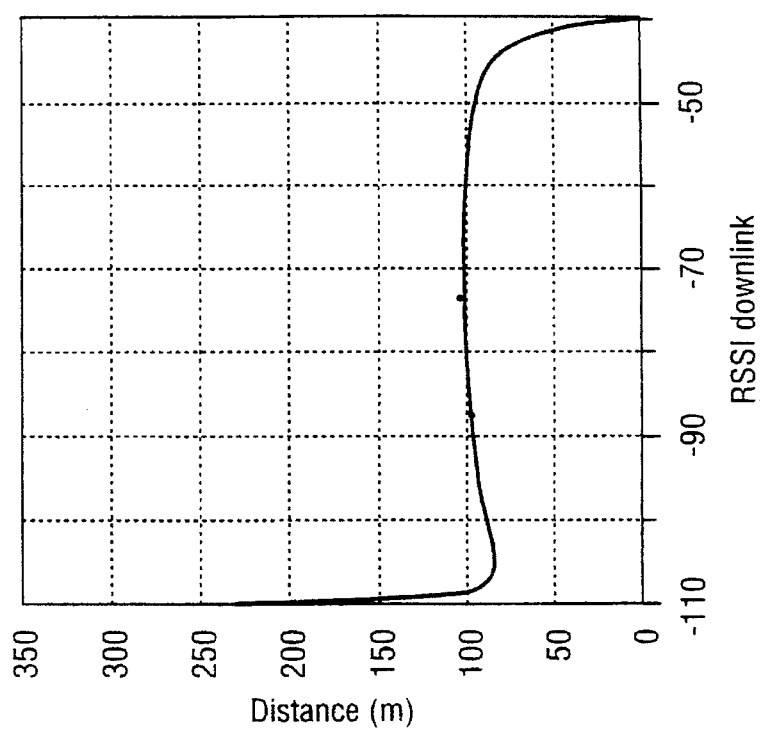
FIG. 19 is a schematic diagram of a fourth sample curve-fit data plot before and after a manual search.
Figure 19:
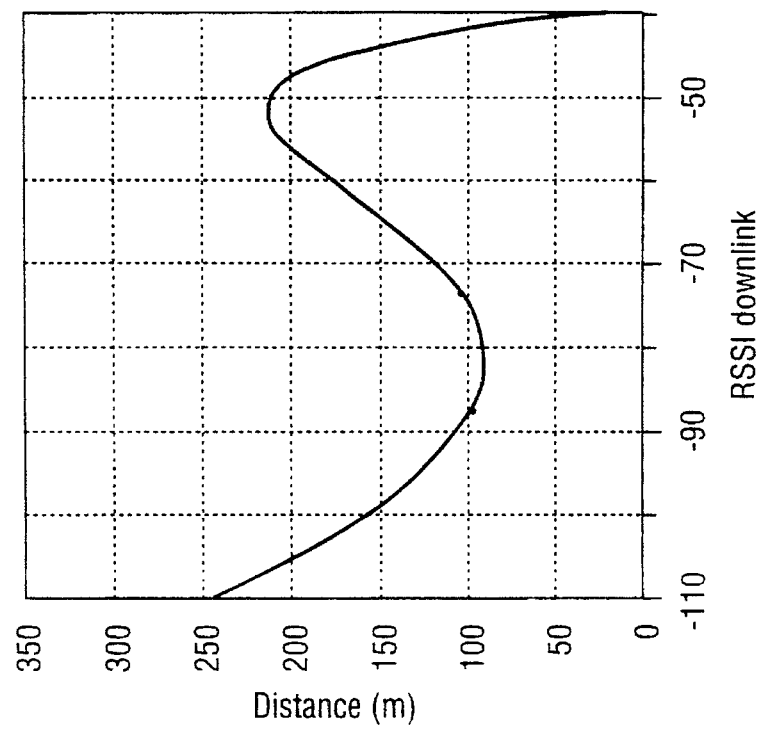

The lowest FitStdErr fit in FIG. 19 displays a more subtle problem. The points along the distance axis (vertical) are not well represented, yet they make up the majority of the data point population. The plot on the right better represents those data and also eliminates questionable swings that are in the left plot.

Although manually searching for the most logical fit may result in a larger FitStdErr, the fit will also be more representative of the actual RF environment. The number of invalid fits by TableCurve 2D, for example, can be minimized by collecting a high number (50–60) of evenly spaced data points within each arc-segment.

Figure 20:
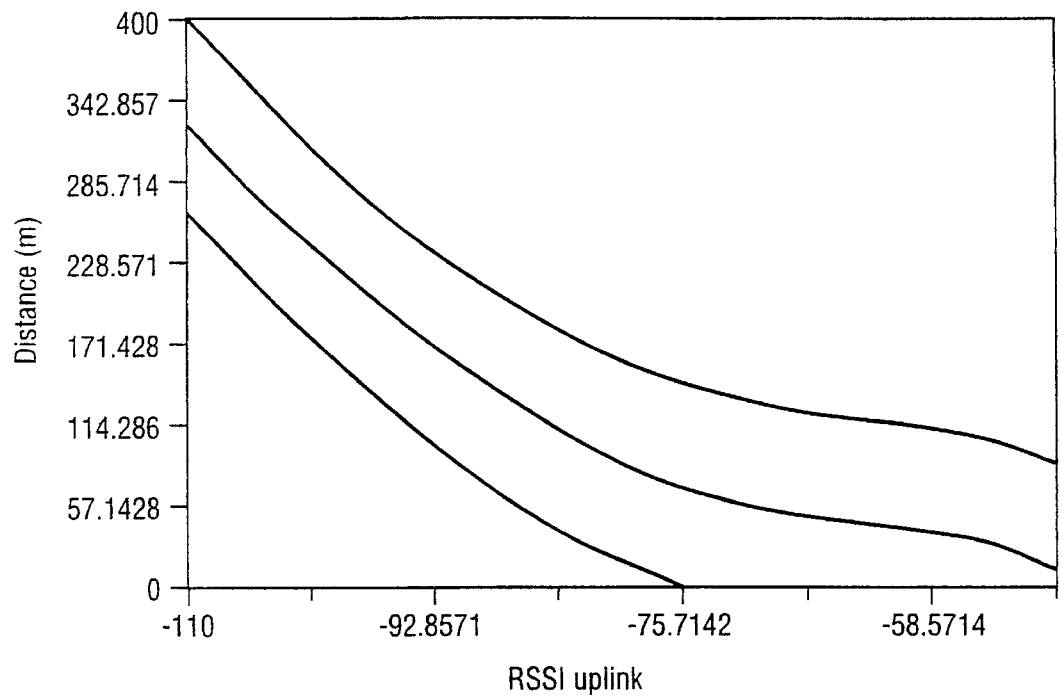
FIG. 20 is a schematic diagram of a best fit confidence interval with maximum and minimum bands.

After the curve fitting program produces a valid fit, 95% confidence intervals (or bands) can be created. These bands (minimum and maximum) are produced by adding and subtracting twice the FitStdErr to the average fit. Any negative distances will be eliminated from the band. FIG. 20 shows a best fit with maximum and minimum confidence bands. It should be noted that through simple numeric integration, the area of the interval can be computed. The area of the band will describe how volatile the data is throughout a complete arc-segment.

Figure 21:
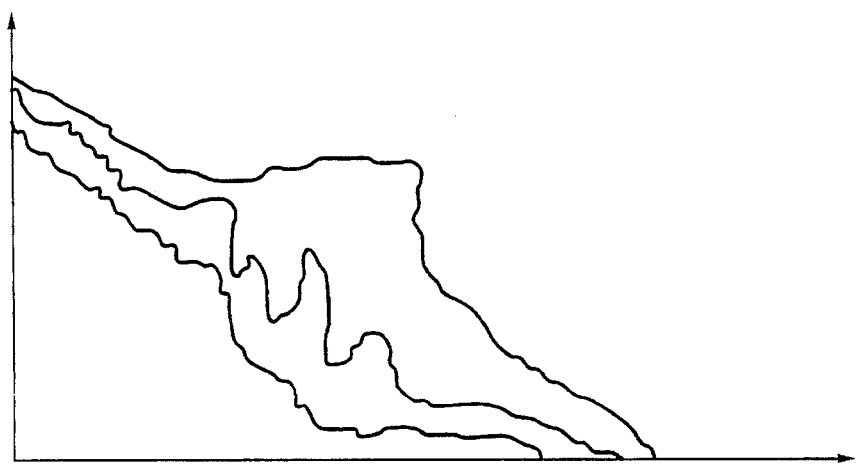
FIG. 21 is a schematic diagram of a representative Bollinger band.

After the confidence intervals have been determined, Bollinger bands can be created for the data in each arc-segment 204. As indicated above, Bollinger bands are similar to the confidence intervals in that they represent a range in which data points are likely to reside. However, Bollinger bands widen according to the volatility of the data in a certain area of a particular arc-segment. Basically, the Bollinger interval is wide in areas where the deviation of the data points is large, and is narrow in areas where the deviation of the data points is small. FIG. 21 shows how Bollinger bands widen in areas of data volatility.

As discussed above, Bollinger bands use a "sliding window" technique to compute a moving average across a data set. The sliding window size for location purposes will be 20% of the data population for each arc-segment. As with confidence intervals, the area of the Bollinger bands can be computed through simple numeric integration. The advantage of the Bollinger band over the confidence interval is that the area of the Bollinger band in a discrete section of an arc-segment can describe the volatility of the data in that section. The area of the confidence interval can only describe the volatility of the data throughout a complete arc-segment.

A problem with Bollinger bands is that they have a phase lag that is introduced in calculating the moving average. Because of this phase lag, the Bollinger band widens slightly beyond the volatile data. The amount of phase lag is dependent on the size of the sliding window.

Figure 22:
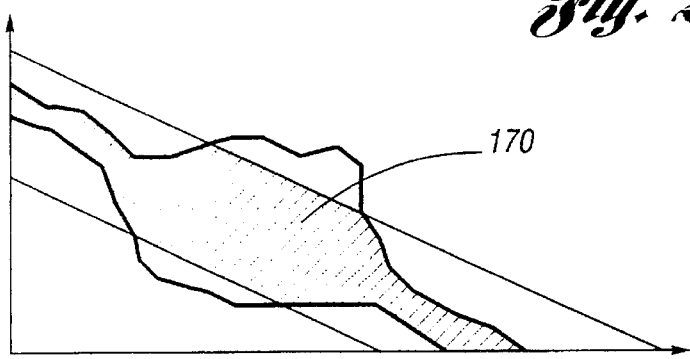
FIG. 22 is a schematic diagram of a location band.

To "clip" the phase lag, the Bollinger band and confidence intervals can be intersected. The intersection of these two bands becomes the location or distance band 206, as shown in FIG. 22. The location band 206 is what will be used to generate (for the location databank) minimum and maximum distances for any valid values of any of the parameters. The area of the location band 206 can be computed with simple numeric integration and is an indication of the data volatility.

At this stage, location bands have been produced for all parameters in each arc-segment. Now, a method of determining which parameters to use is needed. Fuzzy logic will be used to determine which parameters will be used when estimating a distance. Fuzzy logic, as known to those skilled in the art, consists of fuzzy patches or rules which try to explain the behavior of fuzzy systems. Fuzzy patches or rules are simply "if-then-else" statements that describe a discrete section of the system's output. The goal is to have a group of fuzzy patches that accurately describe the system's complete output. In this location system, fuzzy rules will be created to use the parameters with the least volatility to estimate a distance.

Figure 23:
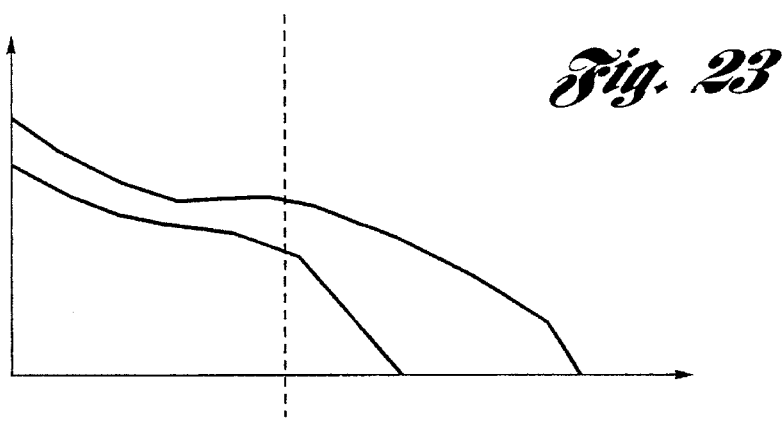
FIGS. 23–24 provide representative schematics of $RSSI_{downlink}$ and $WER_{uplink}$.
Figure 24:
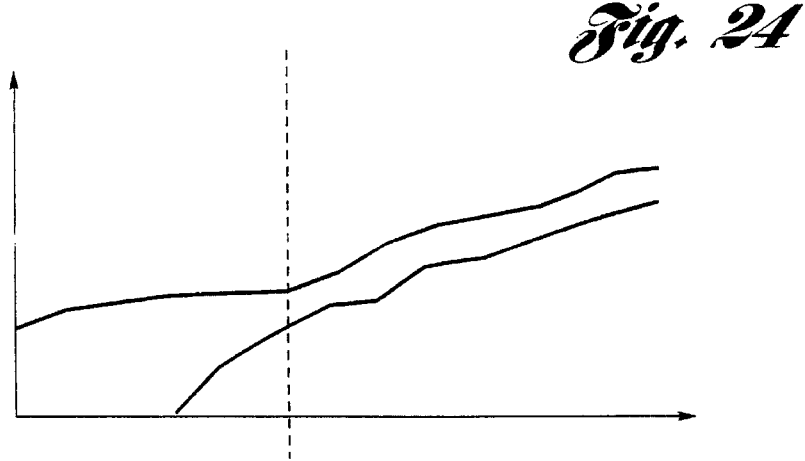

FIGS. 23 and 24 provide examples of two different parameters from the same arc-segment. An example of a fuzzy rule would be as follows: If $RSSI_{downlink}$ reading lies in the range to the left of the dashed line, use $RSSI_{downlink}$. Otherwise, use $WER_{uplink}$.

The above fuzzy rule is an over-simplified case, yet it illustrates the idea behind fuzzy logic. With all parameters being used, weighted averaging can be used to implement a combination of parameters in the fuzzy model. Fuzzy logic is flexible in allowing different parameters to carry different weights. In the location system of the present invention, the weights for the fuzzy logic averaging will be determined by the volatility of the data (used the measure of the location band area). In the "gray" areas of overlapping fuzzy rules, the overlapping rules are added together (with associated weights) and then the average of the curve will be used.

By preparing several individual parameter bands to get the smallest volatility within a "quantization", the best solution may be determined. Finally, the final solution may be compiled using fuzzy logic technique values. For example, in the pseudo code above, each of the database entries is weighted against one another such that the database entry of minimum volatility having the strongest predictor of distance at a particular location for particular values is obtained where more than one rule applies.

As known to those skilled in the art, fuzzy logic is a process where, unlike neural networks, more than one rule applies. The rules are averages in a predetermined weighting scheme. Unlike normal fuzzy logic rules, however, the weighting here pertains to minimum and maximum values. In keeping with the invention, volatility is used as an indicator of the best weight. The variable with the least volatility is weighted the most, however, other variables are not discounted.

In this manner, overlapping RF measurements may be utilized. Thus, 80% of WER and 20% of RSSI might be used in predicting location. The system and method of the present invention averages the minimum distances as well as the maximum distances which then become the min and max boundaries for each arc segment. This process is repeated for all other arc segments which permit a min and max bounding polygon to be drawn around a Radio Port. The process is thereafter repeated for neighboring Radio Ports as they are "heard" to determine the most accurate predicted bounding contours for the other neighboring Radio Ports. The resulting contours (i.e. the minimum and maximum contours) are thereafter drawn around each Radio Port, the intersections of which define the bounding polygon where the mobile unit can be located.

Because the Radio Port data is partitioned into separate arc-segments and then analyzed, there will be discrete jumps in the data between arc-segments. To improve the continuity of the data between arc-segments, a line will be added to help smooth the jumps. The slope of this line will roughly be the magnitude of the jump divided by some $\Delta X$ (where $\Delta X$ is 10–20% of the width of the arc-segment).

Figure 14:
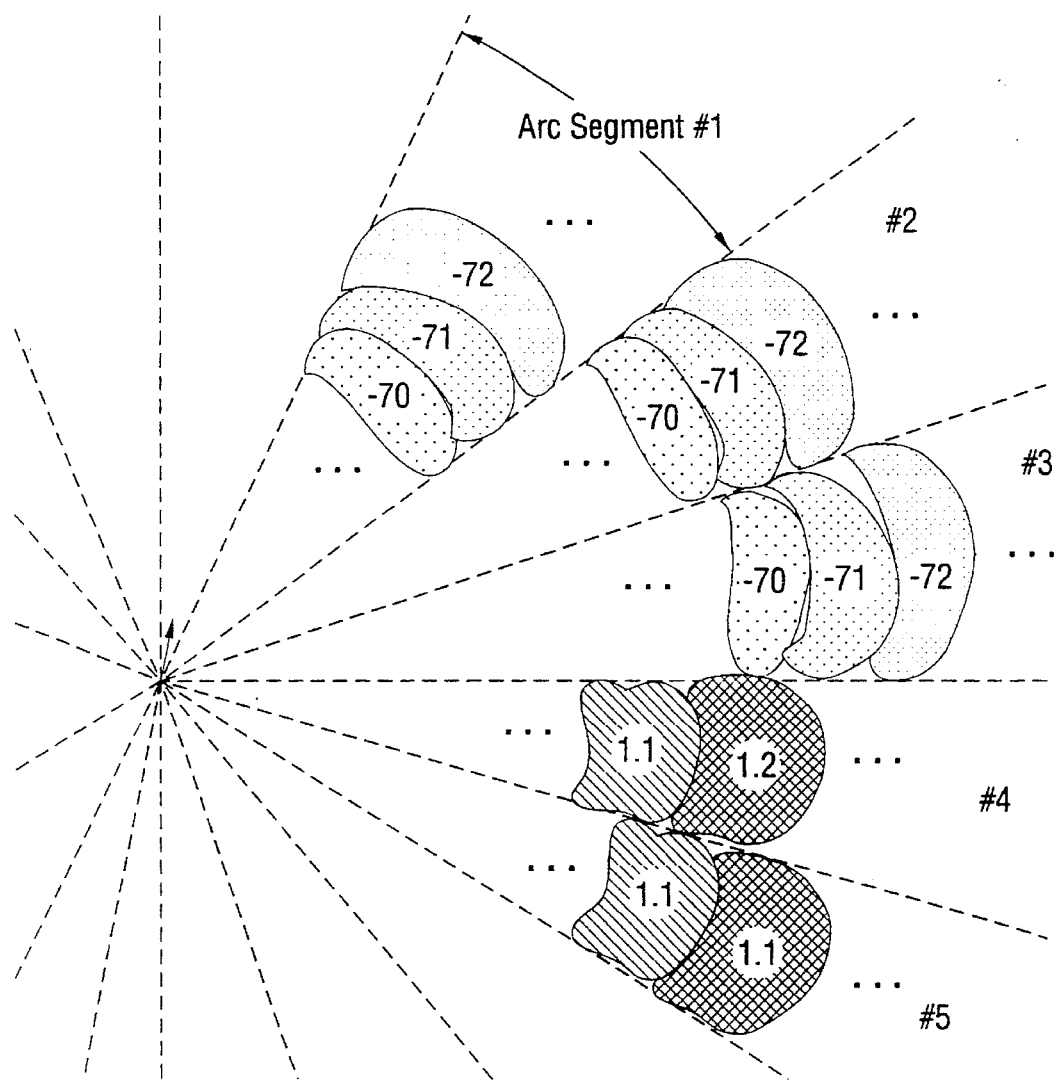
FIG. 14 is a schematic diagram of representative bounding polygons obtained by using a run-time database in accordance with the present invention.
Figure 25:
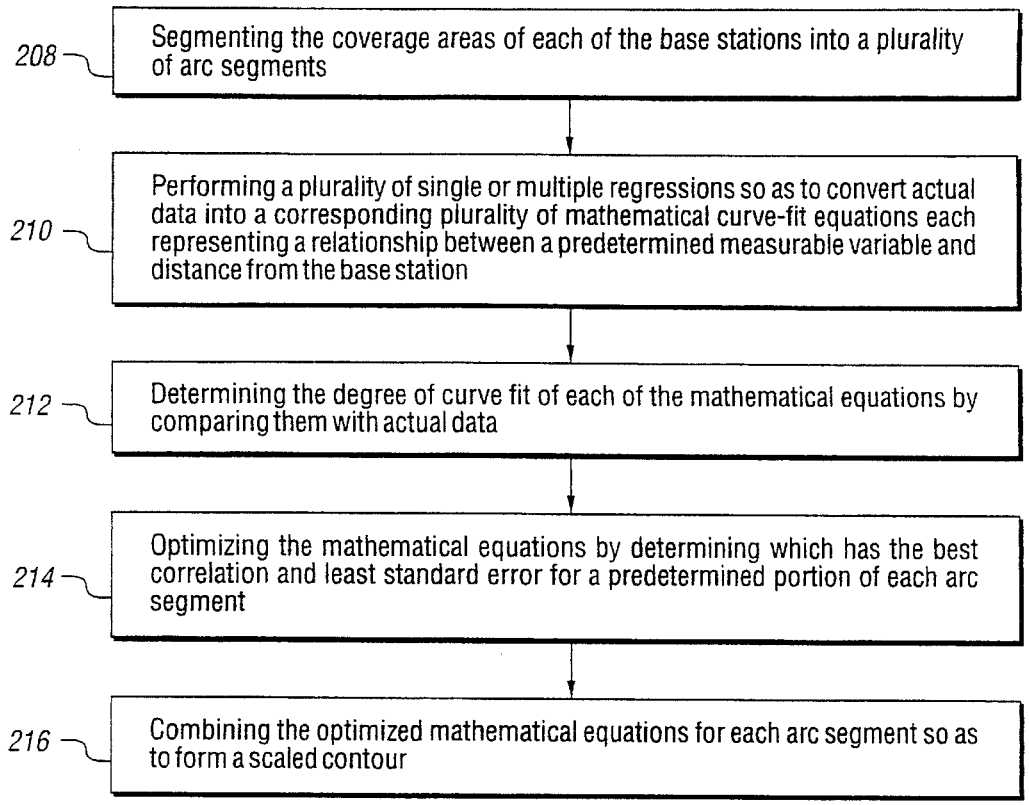
FIG. 25 is a block diagram of the method steps used in accordance with the present invention to obtain scaled contoured shapes.

In keeping with the invention, and by reference to FIG. 25 of the drawings, the step of modeling the determined RF measurements as scaled contour shapes therefore requires segmenting 208 the coverage areas of each of the base stations into a plurality of arc segments designated by reference numeral 204 in FIG. 14. For each of the arc segments 204, a plurality of single or multiple regressions must be performed 210 so as to convert actual data into a corresponding plurality of mathematical curve-fit equations each representing a relationship between a predetermined measurable variable, i.e. RSSI, WER, etc. and distance from the base station. For each of the arc segments, the degree of fit must be determined 212 of the corresponding mathematical equation by comparing each of the mathematical equations with actual data. The mathematical equations may thereafter be optimized 214 by determining which has the best correlation and least standard error for a predetermined portion of each arc segment 204.

In an alternative embodiment, a Genetic Algorithm (GA) may be used to optimize the parameters of each of the single or multiple regressions so as to further improve the degree of fit for greater correlation and minimum standard error. Still further, in cases where there is generally poor correlation between all of the mathematical equations of an arc segment and the actual data, the corresponding base station may be instructed along with the receiver, i.e., the mobile unit, to each temporarily change their transmission frequencies by 10–40 MHz. Thereafter, additional RF measurements may be obtained for the base station at the changed frequency, including its link budget, for the same predetermined plurality of distances and directions. As readily seen, this will increase the number of variables for consideration and analysis.

Figure 26:
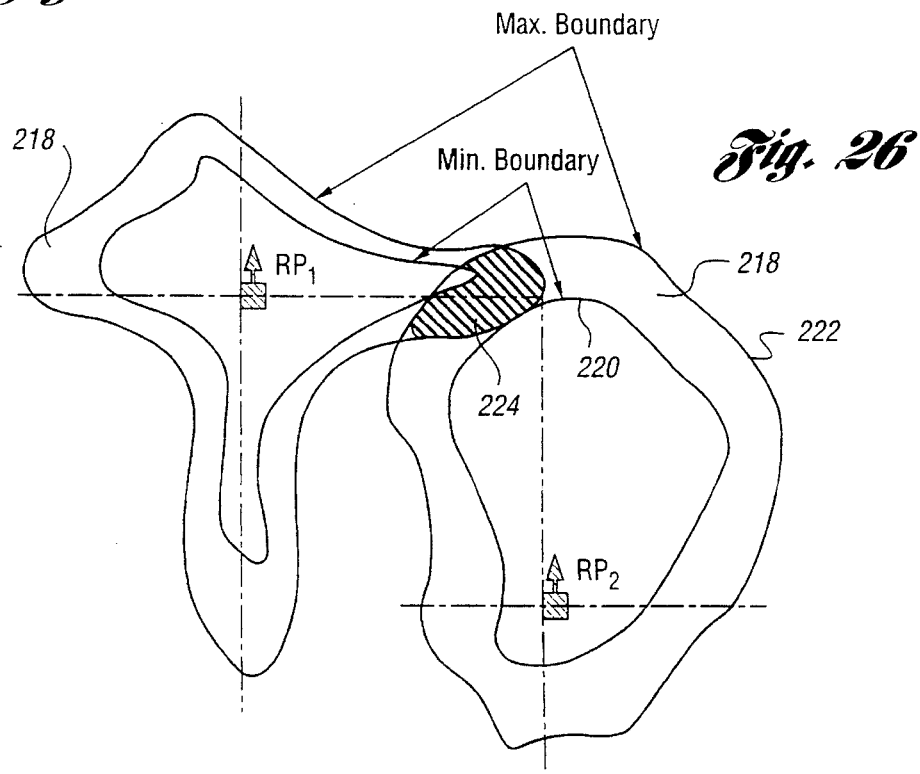
FIG. 26 is a schematic diagram of an example bounding polygon defined by two base stations.

The optimized mathematical equations for each arc segment are thereafter combined 216 so as to form the scaled contours 218 such as that shown in the schematic of FIG. 26.

Each scaled contour 218 has minimum and maximum bounds 220 and 222. After these boundaries have been determined for an entire base station, minimum/maximum boundaries also define minimum/maximum contours, based on a given set of real-time measurements in both the uplink and downlink directions. This process is repeated for neighboring base stations, and the resulting intersection (if any) then define a min/max bounding polygon 224.

Figure 27:
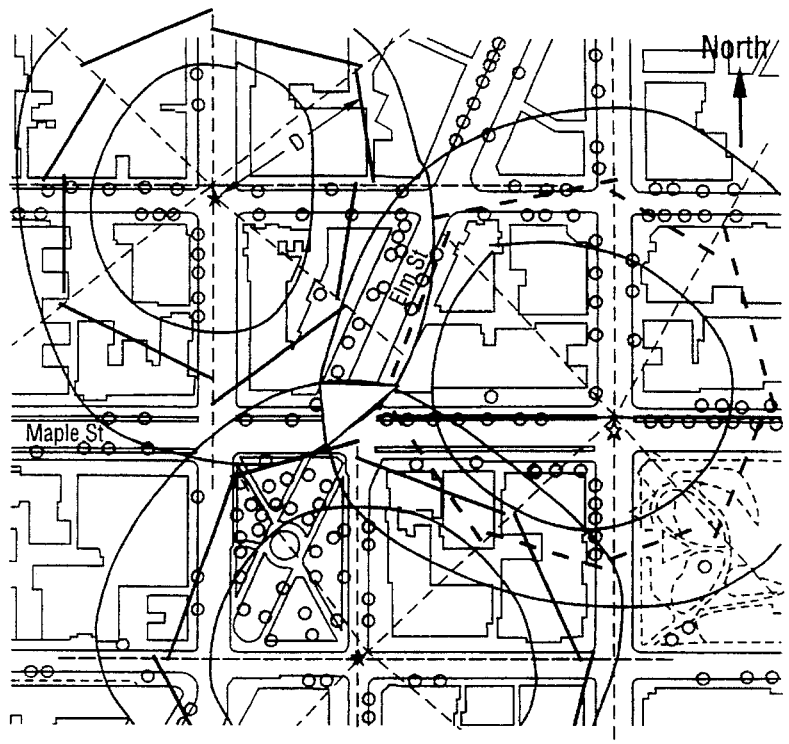
FIG. 27 is a schematic diagram of the bounding polygon of FIG. 14 as projected on an orthophotograph which may be stored digitally.

The polygon is then projected onto a mapping system such as, for example, an orthophotograph which may be digitally recorded, or similar means, with nearby street names as shown, for example, in FIG. 27. In a preferred embodiment, the entire picture may then be sent via a BRI-ISDN or FDDI circuit to a PC or workstation-based video collaboration system (or similar two-wave video system). When used in emergency situations, the video collaboration system would be located in the nearest PSAP. As shown in FIG. 27, the location processing steps of the present invention may be used to locate a "victim" determined to be about midway along Maple Street, as it intersects with Elm Street. Because the bulk of the bounding polygon 224 is along the North side of Maple Street, from an intuitive perspective, the "victim" is more likely to be on the North side of Maple Street.

Figure 28:
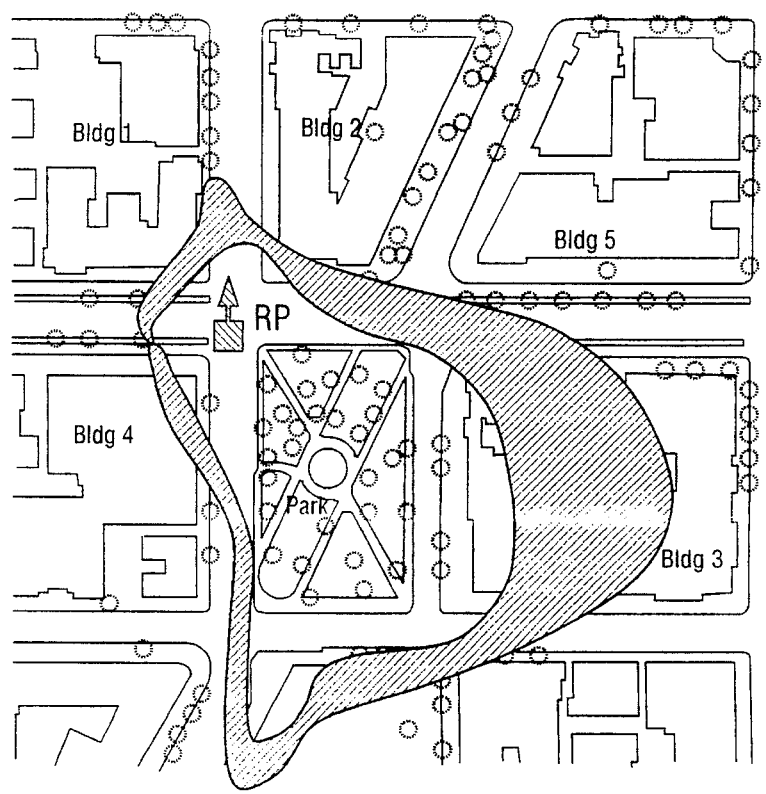
FIG. 28 is a schematic diagram of a sample bounding polygon defined by a single base station.

In keeping with the invention, it should be noted that even in the degenerate case where only one base station's signal can be detected by the handset, min/max bounding bands around the base station, also projected on a high quality digital orthophotograph, can provide superior information to the emergency call taker and the PSAP as opposed to merely providing the base station generic coverage area, as a circle. For example, FIG. 28 shows that based on the RF measurements received, the "victim" cannot be at the same intersection as the base station itself, but rather elsewhere as shown. From a quick inspection of the bounding polygon, it is apparent that there is a strong possibility the "victim" is in Building 3 and less likely that the "victim" is in Building 2, or in the neighborhood park. This type of information, although unusual, could be used by search teams to be most efficient and fast in their task of actually finding the "victim" in accordance with the present invention even though only a very minimum amount of RF measurement data was available in real-time during the call.

Nonetheless, it should be noted that from a location accuracy and efficiency point, the above-described Integrated Services Digital Network (ISDN) approach which requires sending bounding polygon location via video, is contemplated to provide the user with the most accurate location details.

While the best mode for carrying out the invention has been described in detail, those familiar with the art to which this invention relates will recognize various alternative designs and embodiments for practicing the invention as defined by the following claims.

What is claimed is:

1. For use in a wireless communication system including a plurality of base stations each having a corresponding coverage area, a method for determining the position of a mobile unit, comprising:

for each of the base stations, determining in cooperation with a receiver, a plurality of RF measurements for the base station, for a predetermined plurality of distances and directions;

for each of the base stations, modeling its determined RF measurements as a scaled contour shape having minimum and maximum boundaries which is capable of being projected on a Graphical Information System (GIS);

determining RF measurements from neighboring base stations; and determining where the corresponding contours of the RF measurements from neighboring base stations intersect so as to define a bounding polygon area that describes the position of the mobile unit in terms of a minimum and maximum error estimate.

2. The method of claim 1, further comprising:

for each of the base stations, projecting an optimal modeled contour on a GIS;

determining the center of the bounding polygon area formed by the intersection of the projected contours of the neighboring base stations;

determining latitude and longitude for the center of the bounding polygon area; and determining in cooperation with a location databank, street addresses contained within the bounding polygon area.

3. The method of claim 1, wherein the step of modeling the determined RF measurements as scaled contour shapes further comprises:

segmenting the coverage areas of each of the base stations into a plurality of arc segments;

for each of the arc segments, performing a plurality of single or multiple regressions so as to convert actual data into a corresponding plurality of mathematical curve-fit equations representing a relationship between a predetermined measurable variable and distance from the base station;

for each of the arc segments, determining the degree of fit of the corresponding mathematical equations by comparing each of the mathematical equations with actual data;

optimizing the mathematical equations by determining which has the best correlation and least standard error for a predetermined portion of each arc segment; and combining the optimized mathematical equations for each arc segment so as to form the scaled contour.

4. The method of claim 3, wherein the step of determining the degree of fit of the corresponding mathematical equations for each arc-segment further comprises:

for each RF measurement, generating a confidence band and a Bollinger band; and for each RF measurement, determining the intersection of its corresponding confidence band and Bollinger band so as to define a location band.

5. The method of claim 4, wherein the step of optimizing the mathematical equations further comprises using fuzzy logic and weighted averaging to implement a combination of parameters and a fuzzy model.

6. The method of claim 1, wherein the GIS is a Digital Orthophotograph Quad (DOQ).

7. The method of claim 3, wherein the minimum and maximum boundaries of the RF measurements are determined by constructing Bollinger Bands on prior static data.

8. The method of claim 3, wherein said predetermined measurable variables are selected from the group consisting of $RSSI_{up}$, $RSSI_{down}$, $WER_{up}$, $WER_{down}$, $QI_{up}$, $QI_{down}$, $TD_{up}$ and $TD_{down}$.

9. The method of claim 3, further comprising using a Genetic Algorithm (GA) to optimize parameters of each of the single or multiple regressions so as to further improve the degree of fit for greater correlation and minimum standard error.

10. The method of claim 1, wherein the wireless communication system is a Personal Communication System (PCS) having Stage 2 service description PCS reference architecture.

11. The method of claim 3, further comprising:

in cases where there is generally poor correlation between all of the mathematical equations of an arc segment and the actual data, instructing the corresponding base station and/or the mobile unit to each temporarily change their transmission frequencies by 10–40 MGHz; and determining in cooperation with the receiver, said plurality of RF measurements for the base station at the changed frequency, for said predetermined plurality of distances and directions.

12. The method of claim 1, wherein the mobile unit is a residential cordless telephone.

13. The method of claim 1, wherein if a handoff occurs, a handoff trap message is used to extract new location identifiers which would allow the location processing function to continue.

14. For use in a Personal Communication System (PCS) including a plurality of Radio Ports (RPs) each having a corresponding coverage area, a method for determining the position of a mobile unit, comprising:

for each of the RPs, determining in cooperation with a receiver, a plurality of RF measurements for the RP, for a predetermined plurality of distances and directions;

segmenting the coverage areas of each of the RPs into a plurality of arc segments;

for each of the arc segments, performing a plurality of single or multiple regressions so as to convert actual data into a corresponding plurality of mathematical curve-fit equations representing a relationship between a predetermined measurable variable and distance from the RP;

for each of the arc segments, determining the degree of fit of the corresponding mathematical equations by comparing each of the mathematical equations with actual data;

optimizing the mathematical equations by determining which has the best correlation and least standard error for a predetermined portion of each arc segment;

combining the optimized mathematical equations for each arc segment so as to form a scaled contour shape for each RP, each of the contours having minimum and maximum boundaries and capable of being projected on an orthophotograph;

determining which of the RPs can be heard by the mobile unit;

determining where the corresponding contours of the heard RPs intersect so as to define a bounding polygon area that describes the position of the mobile unit in terms of a minimum and maximum error estimate.

15. The method of claim 14, further comprising:

for each of the heard RPs, projecting its modeled contour on an orthophotograph;

determining the center of the bounding polygon area formed by the intersection of the projected contours of the heard RPs;

determining latitude and longitude for the center of the bounding polygon area; and determining in cooperation with a run time database, street addresses contained within the bounding polygon area.

16. The method of claim 14, wherein the minimum and maximum boundaries of the RF measurements are determined by constructing Bollinger Bands on prior static data.

17. The method of claim 14, wherein said predetermined measurable variables are selected from the group consisting of RSSIup, RSSIdown, WERup, WERdown, QIup, QIdown, TDup and TD down.

18. The method of claim 14, further comprising using a Genetic Algorithm (GA) to optimize parameters of each of the polynomial regressions so as to further improve the degree of fit for greater correlation and minimum standard error.

19. A method of routing selected Personal Communications System (PCS) telephone calls from mobile units along with location information, comprising:

providing a plurality of Radio Ports (RPs), each of the RPs operative to receive calls originating from a plurality of said mobile units over air interface channels;

providing a Radio Port Controller (RPC) in electrical communication with the RPs;

providing a location databank operative to store real-time RF measurements for each of the RPs.

providing a Location Adjunct Processor (LAP) in electrical communication with the location databank and the RPC;

generating a Trap__Calls__Request message at the LAP for receipt by said RPs for each type of call sought to be trapped by the RPC, the Trap__Calls__Request message containing a bit pattern specifying call type and a flag indicating whether or not the RP should suspend the call while the LAP is determining location;

when one of the RPs receives a call type that matches the bit pattern specified in the Trap__Calls__Request message, generating a Trap__Satisfied message for receipt by the LAP, the Trap__Calls__Request message including call type, RP ID and a transaction ID that the RPC and the LAP will use during the remainder of location processing;

Generating a Get__SU__Data__Request message at the LAP for receipt by the RPC;

identifying the mobile unit that originated the call by reference to the transaction ID and generating a layer 2 REQ__SU__RF__DATA message at the RPC for receipt by the SU;

generating a Get__NRPL__Request message at the LAP for receipt by the RPC to obtain a list of the neighboring RPs surrounding the SU;

generating a Get__NRPL__Reply message at the RPC for receipt by the LAP, the Get__NRPL__Reply containing a list of RP IDs and each RP's status and operating frequency;

generating a Get__Uplink__Data__Request message at the LAP for receipt by the RPC for each of the RPs in the neighboring RP list;

generating a layer 2 REQ__RP__RF__DATA message at the RPC for receipt by each of the neighboring RPs, as requested by the LAP, the layer 2 REQ__RP__RF__DATA message specifying the particular mobile unit and its current transmission frequency;

instantaneously instructing each of the neighboring RPs to tune to the mobile units transmitting frequency, taking predetermined RF measurements for each RP, link budget, and generating a layer 2 RP__RF__DATA message at each of the neighboring RPs to report the RF measurements to the RPC;

generating multiple Get__Uplink__Data__Reply messages at the RPC to forward the RP measurements to the LAP;

generating multiple layer 2 SU__RF__DATA messages at the mobile unit for receipt by the RPC;

generating multiple Get__SU__Data__Reply messages at the RPC to forward the RF measurements to the LAP; and determining location at the LAP in accordance with the RF measurements and generating a SU__Location message for receipt by the RPC, the SU__Location message including location coordinates and corresponding street addresses.

* * * * *